ARRANGEMENT FOR CONTROLLING TRAFFIC IN A SWITCHING NETWORK

Filed June 4, 1964 9 Sheets-Sheet 1

INVENTORS K. D. HOPPER
E. E. SCHWENZFEGER
BY SE Hollander
ATTORNEY

Sept. 19, 1967 K. D. HOPPER ET AL 3,342,945

ARRANGEMENT FOR CONTROLLING TRAFFIC IN A SWITCHING NETWORK

Filed June 4, 1964 9 Sheets-Sheet 4

ARRANGEMENT FOR CONTROLLING TRAFFIC IN A SWITCHING NETWORK

ARRANGEMENT FOR CONTROLLING TRAFFIC IN A SWITCHING NETWORK

United States Patent Office 3,342,945

Patented Sept. 19, 1967

3,342,945

ARRANGEMENT FOR CONTROLLING TRAFFIC IN A SWITCHING NETWORK

Kenneth D. Hopper, Holmdel, and Edward E. Schwenzfeger, Red Bank, N.J., assignors to Bell Telephone Laboratories, Incorporated, New York, N.Y., a corporation of New York Filed June 4, 1964, Ser. No. 372,513

17 Claims. (Cl. 179—18)

ABSTRACT OF THE DISCLOSURE

In a multioffice telephone network a traffic control unit at one switching office automatically interrogates each office to ascertain the traffic conditions thereat. The interrogated office reports its traffic conditions to the other offices which can alter their routing, accordingly, to compensate for any traffic congestion in the network.

This invention relates to switching networks and particularly to arrangements for controlling the distribution of traffic in a switching network.

More specifically, this invention relates to communication networks wherein instrumentalities are employed for minimizing the effects on the network of traffic overloads occurring at individual switching offices serving the network.

In a very particular aspect this invention relates to telephone switching networks served by a plurality of switching offices wherein each office is apprised of the traffic conditions at other offices so that the offices can initiate the necessary remedial action should traffic congestion occur in any part of the network.

Integrated switching networks such as large nationwide communication networks are subjected to fluctuating traffic conditions, and when abnormal traffic surges are experienced, the network becomes congested and customer service is degraded.

Certain abnormal traffic conditions can be anticipated since they occur at predictable times. For instance, it is well known that switching offices experience so called "peak-busy hours" primarily due to the calling habits of the customers or the nature of the community being served by the switching office. In a business community, for example, a switching office may reach its peak-busy hour during the morning of an average business day when most of the commercial establishments are commencing their normal business activities.

On the other hand, other abnormal traffic conditions are unforeseeable and may occur as a result of hurricanes, floods, defense emergencies or other similar situations.

It would be impracticable and uneconomical to provide sufficient facilities to care for all possible traffic situations, but nevertheless, congestion in one sector of a network can adversely affect service in the entire network including those sectors that have a substantial margin of facilities.

Typically, a large nationwide telephone network is made up of smaller switching networks or regions. Each region is served by one or more control switching points for establishing connections between local offices within the region and for establishing connections to and from other regions. These control switching points are generally classified in ascending order as toll centers, primary outlets, sectional centers and regional centers. The toll centers each serve a plurality of local switching offices which, in turn, serve the telephone customers in the various communities in the toll center area. Primary outlets, in addition to serving many toll centers in their area, also serve as switching points for calls between remote toll center areas. Sectional centers, on the other hand, serve traffic between the toll center areas in a given section, and they also switch calls between toll centers and primary outlets. While regional centers may also serve as toll centers for nearby local offices, they are primarily used for switching calls between primary outlets and sectional centers and calls to and from other regional centers.

The control switching points are interconnected via a network of trunks, and each control switching point has common equipment for controlling connections to the trunks. The common control equipment is responsive to digital information received over a trunk incoming from a calling office and utilizes this information to select a trunk to the next adjacent control switching point in the proper route to the called office. A connection between two remote local offices is established, therefore, by linking together a plurality of adjacent control switching points in the appropriate trunk route between the two local offices.

Advantageously, each control switching point is connected by trunks to many other switching points, and the common control equipment at a particular switching point is generally programmed to select trunks to a called office from various routes in a predetermined manner. More specifically, the common control equipment will first attempt to select a trunk via the most direct route, and if these trunks are unavailable, the equipment will "route advance" and attempt to select an available trunk in one or more of the alternate routes.

Flexible alternate routing provisions are desirable at control switching points to more fully utilize all network trunking and switching facilities that are available. If, for instance, one region of a network is experiencing an abnormal amount of traffic while other regions are handling relatively little traffic, it is desirable to temporarily route calls via the relatively idle regions to relieve congestion in the busy region.

By permitting unrestricted alternate routing at control switching points certain events take place which may degrade over-all network performance by repeated attempts to complete a limited number of calls. As an example, each control switching point receives digital information representing the called customer's telephone number over an incoming trunk from the preceding switching office. This information might comprise an area code number, the called local office code number, and the called party's telephone number. The common equipment at the control switching point utilizes the area code and office code information to select a trunk to the next adjacent switching point in the proper trunk route to the called customer. The control switching point then forwards the digital information to the adjacent switching point where a similar trunk selection takes place. This process is repeated until the last link is established in a trunk route between the calling and called customers.

At large control switching points, such as regional centers having many alternate route selections, the control equipment may be held busy to many calls for prolonged periods while laboriously searching for an available route to dispose of one particular call.

Under normal circumstances the common control equipment has a very short holding time, and it is advantageous to permit a limited amount of traffic incoming to a busy regional center to wait for the common equipment that may imminently become available. It must be realized, however, that other control switching points such as toll centers, primary outlets and sectional centers, which are attempting to route traffic through the busy regional center, may also be inconvenienced by this waiting. This waiting results in a longer holding time for the common control equipment at those switching points seeking access to the busy regional center which in turn causes further delays on calls incoming to these control switching points from local offices and other control switching points.

If the situation is allowed to prevail for any length of time without control, traffic begins to "back up," and the entire network may rapidly become congested due to an overload at one strategically located switching point. In other words, congestion at one switching point in a network might set up a "chain reaction" causing delays at virtually every other switching point in the network. These delays generally result in common control equipment "timeouts" requiring the customer to make additional attempts to complete his call. Numerous "timeouts" and "second attempts" further aggravate the situation by generating more traffic for the apparently overloaded network.

It is, therefore, one object of this invention to minimize the effect on the network of traffic overloads occurring at individual switching points serving the network.

Various schemes have heretofore been devised for controlling traffic in a communications network. For example, arrangements are known whereby supervisory personnel are provided with monitoring instruments for evaluating the traffic conditions at various control switching points in the network. If an overload is detected at one of the monitored control switching points, the personnel notify those control switching points having access to the overloaded switching point so that traffic can be manually rerouted to by-pass the congested switching point. It will readily be appreciated, however, that arrangements such as these, which require human decision making and coordination, are cumbersome in connection with high speed switching systems where traffic overloads are sporadic and of very short duration.

It is, therefore, another object of this invention to improve the responsiveness of traffic overload control arrangements in a switching network.

Still other arrangements are known for controlling overloads in a switching network whereby trunks between two control switching points are monitored at the originating switching point, and when a predetermined number of trunks become busy, the routing at the originating switching point is altered reserving the remainder of the trunks in that route for calls which cannot be routed via alternative routes. Of course, with this arrangement wherein the routing is under control of the originating switching point, calls may be prematurely diverted from a control switching point which still has a substantial margin of common equipment available for handling additional calls, merely because a trunk group busy condition occurred in one route.

A further object of this invention, therefore, is to make traffic overload control arrangements more sensitive to impending overload conditions at the various switching points.

In those networks wherein connections are established on a progressive basis, that is from the calling office through each successive control switching point to the called office, the individual calls may proceed through many control switching points only to find that the last switching point, serving the called office, is congested and the call cannot be completed regardless of how many alternate routes are attempted.

Furthermore, when an alternate route is selected due to the inability to complete a call via the first choice route, the switching point making the selection of the alternate route is unaware of the traffic conditions it will encounter via the alternate route and unaware of the capabilities of the alternate route for handling the additional traffic to be offered thereto.

It is, therefore, a further object of this invention to provide traffic overload control arrangements for a communications network wherein each switching center in the network will be apprised of the traffic conditions at other switching centers serving the network.

In accordance with one specific illustrative embodiment of this invention, a regional center, designated herein as St. Louis, is provided as a control switching point for calls to and from a plurality of toll centers. For reference purposes, the toll centers have been designated as Denver, Dallas, New York and Miami. Denver and Dallas calls to and from the Miami and New York toll centers are routed through the St. Louis regional center; however, if the trunks via St. Louis are unavailable, alternate trunks are available through another regional center designated herein as Chicago. It is to be understood of course that the use of specific geographic designations for the various switching centers is solely employed herein as an aid to the reader in appreciating the scope of the problems solved by our invention and is in no sense to be considered as limiting or necessary. In fact, these may be considered as arbitrary designations employed herein merely for convenience.

At the regional centers and at the toll centers of the network traffic reporting circuits are employed to monitor the traffic conditions being experienced at the various control switching points of the network. The traffic reporting circuits are coupled together over a traffic data link and the data link is coupled to a traffic control unit located at one of the switching offices, e.g., Miami.

Each traffic reporting circuit can be set to operate when its respective switching office becomes overloaded to the extent that calls through the office are experiencing appreciable delays and traffic through the entire network may be seriously jeopardized. When any one of the reporting circuits operates, indicating a potential congestion of the network, the circuit sends a "bid" signal over the data link to all offices and to the traffic control unit at Miami. The "bid" signal alerts all offices that one office wishes to report an adverse traffic situation to the network and causes the traffic control unit to begin interrogating each office as to its traffic situation.

The traffic control unit interrogates each office by addressing each office over the data link, and each office answers back over the link informing the other offices in the network of its traffic conditions.

The information pertaining to the traffic conditions at the various switching offices in the network is registered at each office, and this information is used to alter the routing program at the various control switching points so that each control switching point will endeavor to divert traffic from the congested portions of the network until the overload conditions in those portions of the network subside.

The traffic control unit will continue interrogating each office until each office reports back favorable traffic conditions within its portion of the network, and when traffic is being handled satisfactorily in the entire network the traffic control unit will restore to normal.

One feature of this invention resides in an arrangement for automatically controlling the distribution of traffic in a network in accordance with impending overloads at switching offices serving the network.

Another feature of this invention is found in a switching network traffic control arrangement wherein means are provided for transmitting to switching offices signals indicative of the load conditions at other switching offices.

A more specific feature of this invention resides in an arrangement for minimizing the effects of traffic overloads on a telephone switching network wherein means responsive to an overload in one portion of the network will cause all switching offices in the network to be informed of the traffic conditions at all other switching offices in the network so that the switching offices can properly divert traffic from the overloaded portions of the network.

A still more specific feature of this invention resides in an arrangement for controlling traffic overloads in a communications network wherein means are provided at each switching office for monitoring the traffic load conditions thereat, wherein means are provided for interrogating each office and for transmitting to the other offices indicia representative of the load conditions at the interrogated offices and wherein means are provided for controlling the establishment of connections at each switching office in accordance with the load indicia received from other offices to divert traffic from the overloaded switching offices.

These and other objects and features of the invention will become readily apparent from the following description made with reference to the drawing, in which.

GENERAL DESCRIPTION

The arrangement and operation of the various components in the illustrative embodiment of this invention will be described subsequently with reference to the detailed FIGS. 2–9. However, in order to first gain an overall general understanding of the arrangement contemplated, a brief and general description will first be given with reference to the block diagram of FIG. 1.

*Arrangements of components*

Figures 1, 10:
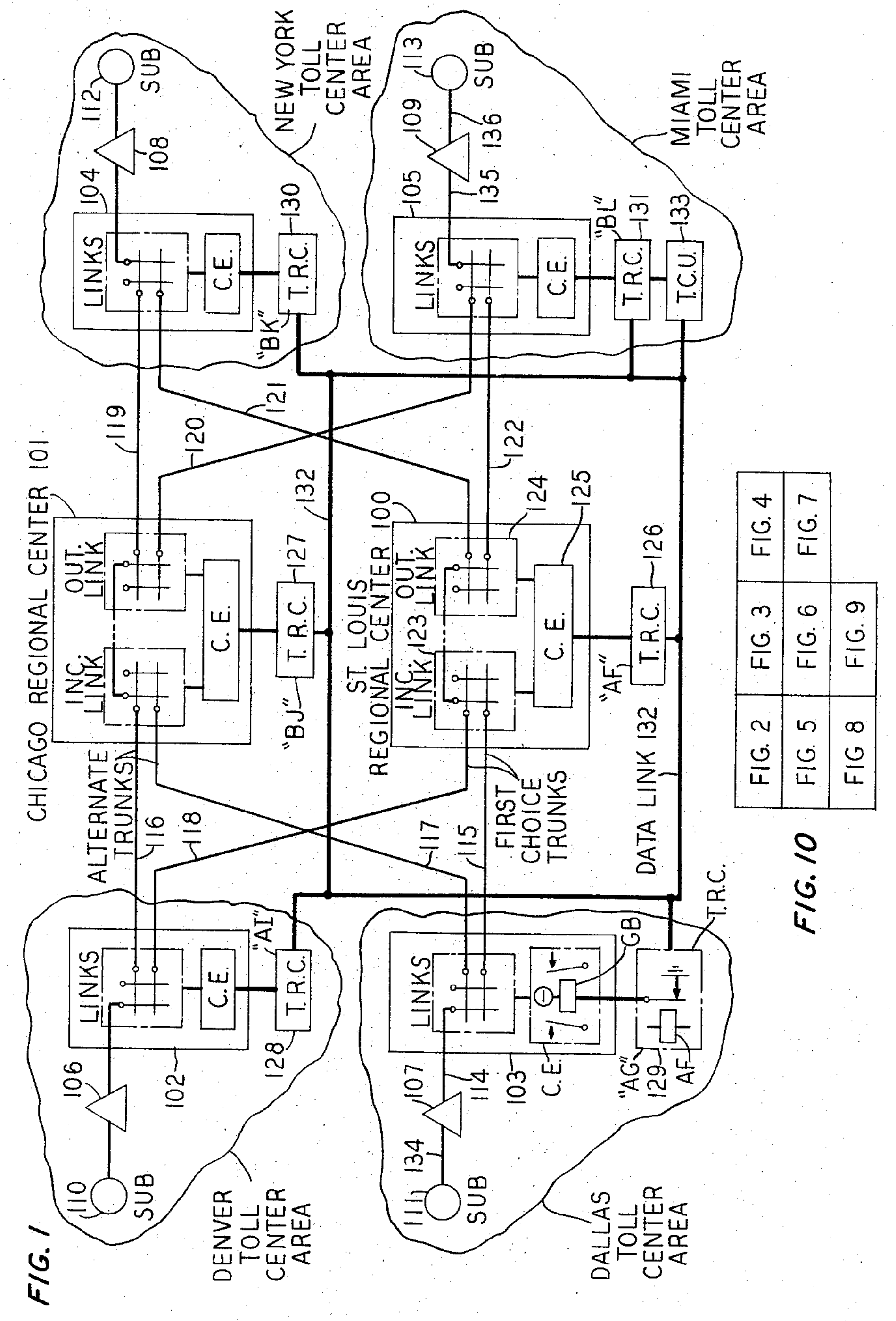
FIG. 1 shows a block diagram of the invention employed in a telephone switching network.
FIG. 10 shows the arrangement of FIGS. 2–9.

Referring, therefore, to FIG. 1 there is shown a typical telephone network having two regional centers 100 and 101 designated St. Louis and Chicago, respectively. These regional centers serve calls to and from the many toll center areas such as the four toll center areas designated Denver, Dallas, New York and Miami shown in FIG. 1.

In each of the toll center areas there is shown a toll switching office and a local switching office. The toll switching offices are represented by the block diagrams designated 102–105, and each toll switching office or toll center, as it is sometimes referred to, serves many local offices within its toll center area. To simplify the drawing only one local office has been shown in each of the toll center areas and these local offices are represented by the triangles designated 106–109. These and similar local offices serve the many telephone customers in the various cities and municipalities in the toll center area.

While each local office may be capable of serving thousands of telephone subscribers only one subscriber is shown connected to each local office, and these subscribers are represented by the circles designated 110–113.

The subscribers are connected to their local offices over subscriber lines in a well-known manner, and each local office is connected over trunks to its "home tandem," i.e., the toll switching center serving the toll center area. For example, the local office 107 is connected to toll center 103 in the Dallas toll center area over trunks in trunk group 114 which may comprise many trunks. It is over one of these trunks in group 114 that calls are completed to and from local office 107 within the Dallas toll center area or to and from other toll center areas.

To complete calls to and from the Dallas toll center area to other toll center areas, the Dallas toll center is connected over trunks to the appropriate regional centers. More specifically, trunk group 115 connects the Dallas toll center with the St. Louis regional center 100 and trunk group 117 connects the Dallas toll center 103 with the Chicago regional center 101. In a similar manner the toll centers in the Denver, New York, and Miami toll center areas are connected to the regional centers over other trunk groups as shown in FIG. 1.

It will be noted that trunk groups 115 and 118 to the St. Louis regional center 100 are designated "first choice" trunks while trunk group 116 and 117 connected to the Chicago regional center 101 are designated "alternate" trunks. This is to signify that for calls originating at the Dallas and Denver toll centers to be terminated in the New York or Miami toll center areas, toll switching offices 103 and 102, respectively, will first attempt to select available trunks in the first choice routes via St. Louis and if these trunks are busy, the the trunks in the alternate groups 117 and 116 via Chicago will be made available for selection.

At each regional center and at each toll center there is shown a block diagram of a typical toll switching office. Reference will be made to the block diagram for the St. Louis regional office 100 since it is shown in more detail, but for the purpose of this example it can be assumed that each of the other switching centers 101–105 is identical.

Switching office 100 comprises an incoming link 123 on which trunks incoming from the various toll centers appear, an outgoing link 124 on which outgoing trunks to the various toll centers appear and common control equipment 125. Common control equipment 125 is responsive to service request signals on incoming trunks for selecting and establishing connections through the incoming and outgoing links to the proper outgoing trunks in a well-known manner.

While only trunk groups incoming from Dallas and Denver and trunk groups outgoing to New York and Miami are shown, it will be readily understood that trunk groups are also provided outgoing from St. Louis to Dallas and Denver and incoming to St. Louis from New York and Miami, but these trunk groups have been omitted from the drawing for ease of illustration.

Coupled to the common control equipment at each switching center is a traffic reporting circuit. These traffic reporting circuits are designated 126–131 for the switching centers 100–105, respectively, and each reporting circuit monitors its associated switching office to ascertain the traffic conditions being experienced at that particular office.

The traffic reporting circuits at the various switching offices are connected together and to traffic control unit 133 in the Miami toll center area over a data link 132. Traffic control unit 133 functions to interrogate the various switching offices over the data link to determine the traffic conditions at each office, and when interrogated, each switching office will answer back over the same data link to inform the other offices of its traffic situation.

*Call from Dallas to Miami via St. Louis*

To illustrate the overall operation of the network a typical call from customer 111 in the Dallas toll center area to customer 113 in the Miami toll center area via available St. Louis facilities will now be described.

Customer 111 in the Dallas area, wishing to call customer 113 in the Miami area, lifts his telephone receiver and dials over subscriber line 134 information as to the Miami area code followed by the local office code and the telephone number assigned to customer 113. This information might consist of ten digits such as 305 CH3-1000 wherein the first three digits represents the Miami area code. The next three digits represent the code for local office 109 in the Miami area and the last four digits represent the telephone number of customer 113.

The local office 107 in the Dallas toll center area, upon receiving these ten digits, recognizes that the call is to a number outside of the local area and selects an idle trunk from trunk group 114 to its "home" toll center which is the Dallas toll center 103. Upon seizing an idle trunk in trunk group 114 the ten digits are outpulsed over the trunk to the Dallas toll center 103 by one of the many well-known techniques.

The common equipment at the Dallas toll center recognizes the Miami area code and looks at its programmed routing instructions to ascertain the first choice route to Miami which in this example includes trunk group 115 via St. Louis. If it is assumed that idle trunks are available in trunk group 115, the common equipment at toll center 103 selects an idle trunk from trunk group 115 and waits for an idle sender to be attached at the St. Louis regional center 100. When an idle sender has been attached to the trunk at St. Louis, the ten digits are outpulsed over this trunk and registered in the sender at the St. Louis regional center 100.

Through various translating arrangements, not shown, the common equipment at the St. Louis regional center 100 recognizes that the call is for the Miami toll center area and selects, in accordance with a predetermined routing program, an outgoing trunk in trunk group 122 to toll center 105 at Miami. Seizing an idle trunk in trunk group 122 causes a sender to be attached at toll center 105 and the digital information is then forwarded over the trunk from the St. Louis regional center to the Miami toll center 105. In this example no other intermediate switching centers are needed to complete the call, and since the call is to a local office in the Miami toll center area, the area coded 305 can be deleted, and only the local office code and the called telephone number for subscriber 113 need be outpulsed over the selected trunk in trunk group 122.

At the St. Louis regional center 100 the appropriate linkage is established to interconnect the trunk incoming from the Dallas toll center to the selected outgoing trunk to Miami, and the common control equipment associated with this call at St. Louis releases to become available to serve other calls.

The toll center in the Miami toll center area receives the digital information in a manner similar to that just described and thereafter establishes a connection over an idle trunk in trunk group 135 to local office 109 which extends the call to customer 113 over his line 136.

From the foregoing description it will now be realized that a connection between two remote offices is established by progressively connecting together trunks between adjacent switching offices beginning with the office serving the calling subscriber.

*Call from Dallas to Miami via alternate route*

When toll center 103 received from local office 107 the ten digits comprising the called area code, the called local office code and the telephone number of called customer 113, the common equipment at toll center 103 ascertained the proper routing and tested for an idle trunk in trunk group 115 to St. Louis. If a trunk was available in trunk group 115, the trunk was seized and toll center 103 awaited for the connection of an idle sender to the trunk at the St. Louis regional center 100.

If, however, there were no trunks available in trunk group 115 via St. Louis, the common control equipment at the Dallas toll center 103 would look to its programmed routing instructions for an alternate route. The routing of a particular call is ascertained from a predetermined routing program which, in the assumed example, requires the alternate-routing of calls to Miami via the Chicago trunk group 117 when the St. Louis route becomes congested. The common equipment at toll center 103 upon finding no trunks available in trunk group 115 would then search for an available trunk in trunk group 117, and if an available trunk is found in trunk group 117, the call would be extended over this trunk to the Chicago regional center 101, and through this regional center to the Miami toll center in the same manner as the call previously described with respect to the St. Louis regional center 100.

The selection of an available trunk in the first choice route or in one of the alternate routes is, of course, essential to the completion of the call being described, and although trunks in any of these routes outgoing from the Dallas toll center are available, the call to customer 113 in the Miami area may, nevertheless, subsequently be blocked from completion for various other reasons.

As mentioned above, the common equipment at toll center 103 first attempts to select an available trunk in the most preferred route and resorts to an alternate route if the trunks in the preferred route are busy. Regardless of which route outgoing from the Dallas toll center 103 is selected, the common equipment at Dallas is unaware of the traffic conditions that may be encountered along the selected route. For example, an idle trunk to St. Louis may be selected during the period when the common equipment at St. Louis is severely overloaded and unavailable to serve additional calls. Under these circumstances certain common equipment at Dallas would be held busy for prolonged periods while waiting for the common equipment at St. Louis to become available, thus causing possible delays to many other calls being served by Dallas toll center 103.

On the other hand, the call from Dallas may be successfully extended to St. Louis only to block at a point beyond St. Louis due to the unavailability of trunks or common control equipment at other switching centers in the route selected to Miami.

Moreover, adverse conditions might exist at the Miami toll center making it temporarily impossible to complete certain calls. Any attempts to extend Miami bound calls beyond their originating toll centers under these circumstances would be futile until the adverse conditions are rectified.

In accordance with one aspect of our invention, the control switching points are linked together by traffic data link 132 over which each switching point is informed of the traffic conditions existing in the entire network. To illustrate the application of traffic control features to the network, the establishment of a call from Dallas to Miami will now be described assuming that a portion of the network has become congested and it is desired to relieve the congestion by diverting traffic from the congested area.

*Traffic control arrangement*

Let it be assumed that the St. Louis regional center 100 is temporarily experiencing an abnormal traffic surge and although trunks incoming from Dallas and other switching centers are available, the common control equipment at St. Louis is unable to serve additional traffic without causing serious delays at these other switching centers.

The abnormal traffic condition at St. Louis is recognized by traffic reporting circuit 126 which sends a "bid" signal over data link 132 to traffic control unit 133 which, for illustrative purposes, has been shown at the Miami toll center 105. The "bid" signal is also received at the other control switching points to alert them that data relevant to network traffic conditions is to be subsequently transmitted over data link 132.

Each control switching point in the network has a traffic reporting circuit connected to data link 132, and each switching point has been assigned an address code as indicated by the two letters shown in quotation marks (in FIG. 1) for each switching office. For example, the address code assigned to St. Louis regional center 100 is "AF," to the Dallas toll center 103 is "AG," etc. At Miami, traffic control unit 133 acknowledges the "bid" signal received over the data link by interrogating each control switching point in the network requesting each switching center to report back on the traffic conditions thereat. The traffic control unit 133 transmits the first address code, for example "AF," over data link 132 to all switching centers. At each switching center equipment is provided for registering the address code transmitted by the traffic control unit 133, and at the St. Louis regional center 100 (identified by address code "AF") the traffic reporting circuit 126 responds by sending an "answer back" signal over the data link 132. The "answer back" signal contains information as to the load conditions being experienced by St. Louis, and the answer back signal is received and registered at all control switching points in conjunction with the St. Louis address code "AF," thereby informing the switching points of the traffic conditions at St. Louis. Upon receiving an answer back from St. Louis, traffic control unit 133 then transmits the next address code "AG" to interrogate the Dallas toll center 103 which, in turn, responds by answering back over data link 132 in the same manner as St. Louis center answered in response to its address code.

Each control switching point is interrogated in turn and answers back so that upon completion of one interrogation cycle, all control switching points have been informed of the traffic conditions being encountered by all other control switching points in the network. The information registered at the control switching points is then used to alter the routing program at the various switching points in an attempt to divert certain traffic from congested portions of the network thereby minimizing delays and blocking conditions which, if left uncontrolled, might hamper the entire network.

At Dallas, for instance, the reception of the St. Louis address code "AF" followed by an "overload" reply from St. Louis would cause relay AF to operate in traffic reporting circuit 129. Relay AF, in operating would release trunk group busy relay GB so that certain calls which normally switch through the St. Louis regional center 100 are now diverted through the Chicago regional center 101 even though trunks are still available in the St. Louis route. The trunks still available to St. Louis might be reserved for calls that can only be completed via the St. Louis route. On the other hand, if the traffic information registered at the Dallas toll center 103 indicated that all trunks were busy in the final link serving called customer 113 (i.e., trunk group 135 to the called local office 109), there would be no reason for extending the call from Dallas, and the call might be disposed of by routing it to overflow or to a special announcement trunk which would inform the calling customer that all circuits to the Miami local office are busy.

In the call being described it was assumed that only the St. Louis regional center 100 was experiencing an abnormal traffic surge. Under this assumption the call from customer 111 in the Dallas area could be diverted through the Chicago regional center 101 over trunk group 117 an completed in a normal manner using available trunks in trunk groups 120 and 135.

The traffic control unit 133 at Miami, having once been actuated, will continue to interrogate the control switching points as long as any control switching point in the network is experiencing adverse traffic conditions. If, however, the control switching points "answer back" showing favorable traffic conditions, the routing schemes at each office and the traffic control unit at Miami can all be restored to normal.

Thus, it can be seen that each control switching point is properly apprised of the traffic situation in the entire network, and since the traffic reporting circuits 126–131 at the control switching points can be set to respond to impending overloads, the various switching points can take remedial action to reroute traffic from congested areas to prevent any so called "chain reactions" that might occur if a traffic overload situation were permitted to continue uncontrolled. In addition, toll center switching time is minimized by reducing the unnecessary attempts by common control equipment to seize and test for an idle trunk in a route to a busy switching point although idle trunks may be available in this route. Furthermore, originating sender time-out at the toll centers, which is often caused by the delay in waiting for an available terminating sender at another control switching point, is minimized thereby shortening the overall sender holding time at the toll centers and making this common equipment available to serve other calls.

*Detailed description*

Referring now to FIGS. 2–9 as arranged in accordance with FIG. 10, there is shown a more detailed schematic representation of the same illustrative embodiment of the invention that was set forth in the block diagram of FIG. 1.

A detailed description of the arrangement contemplated will now be given with respect to FIGS. 2–9 and wherever possible the reference designations that were used in the general description with reference to FIG. 1 have been retained for the same equipment shown in the more detailed FIGS. 2–9.

*Arrangement of equipment*

In general, FIGS. 2–9 have been arranged to depict the same telephone network shown in the block diagram of FIG. 1.

Figure 2:
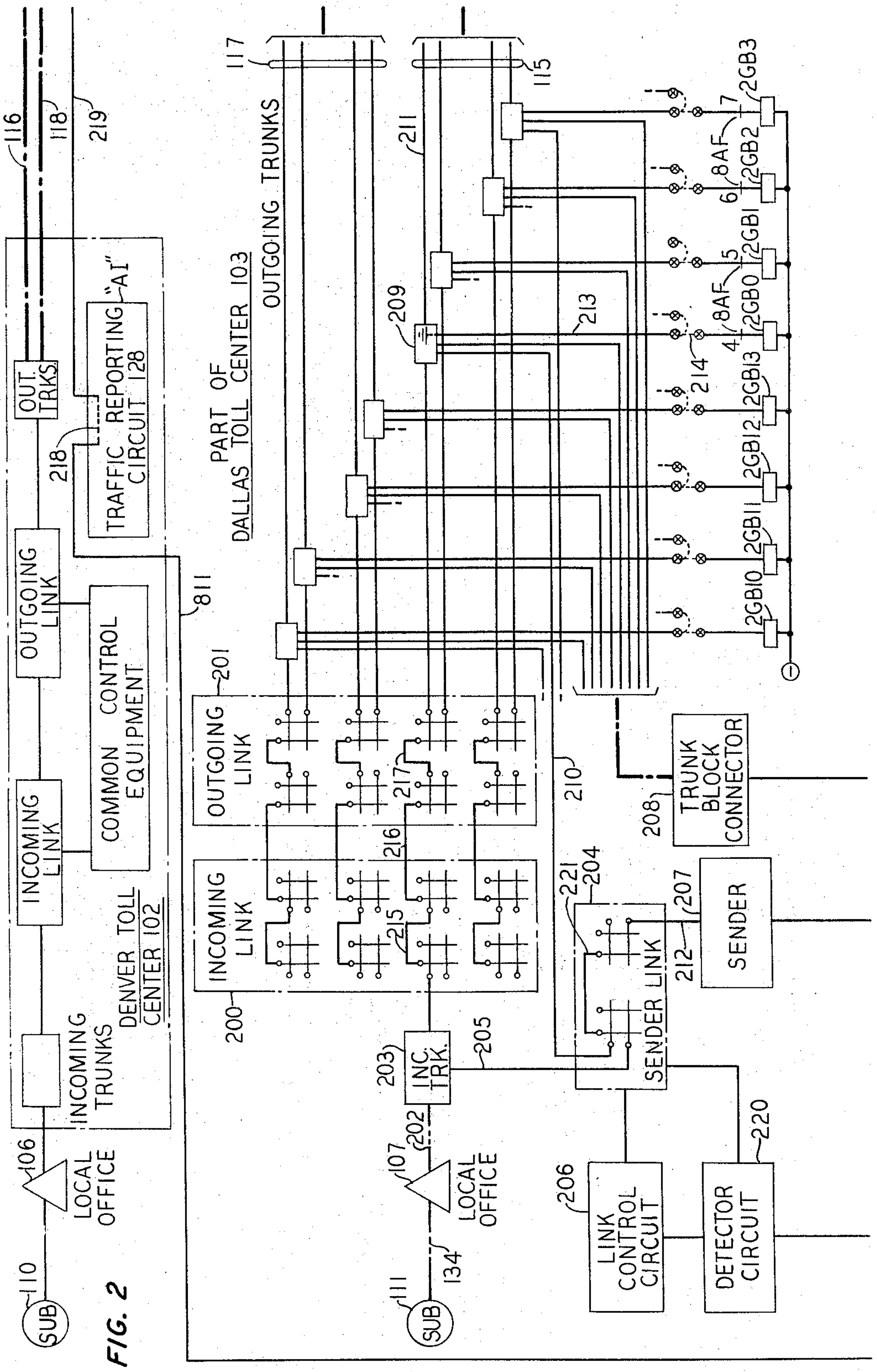
FIGS. 2–9 show a more detailed schematic representation of one specific illustrative embodiment of our invention in the same telephone switching network.
Figure 5:
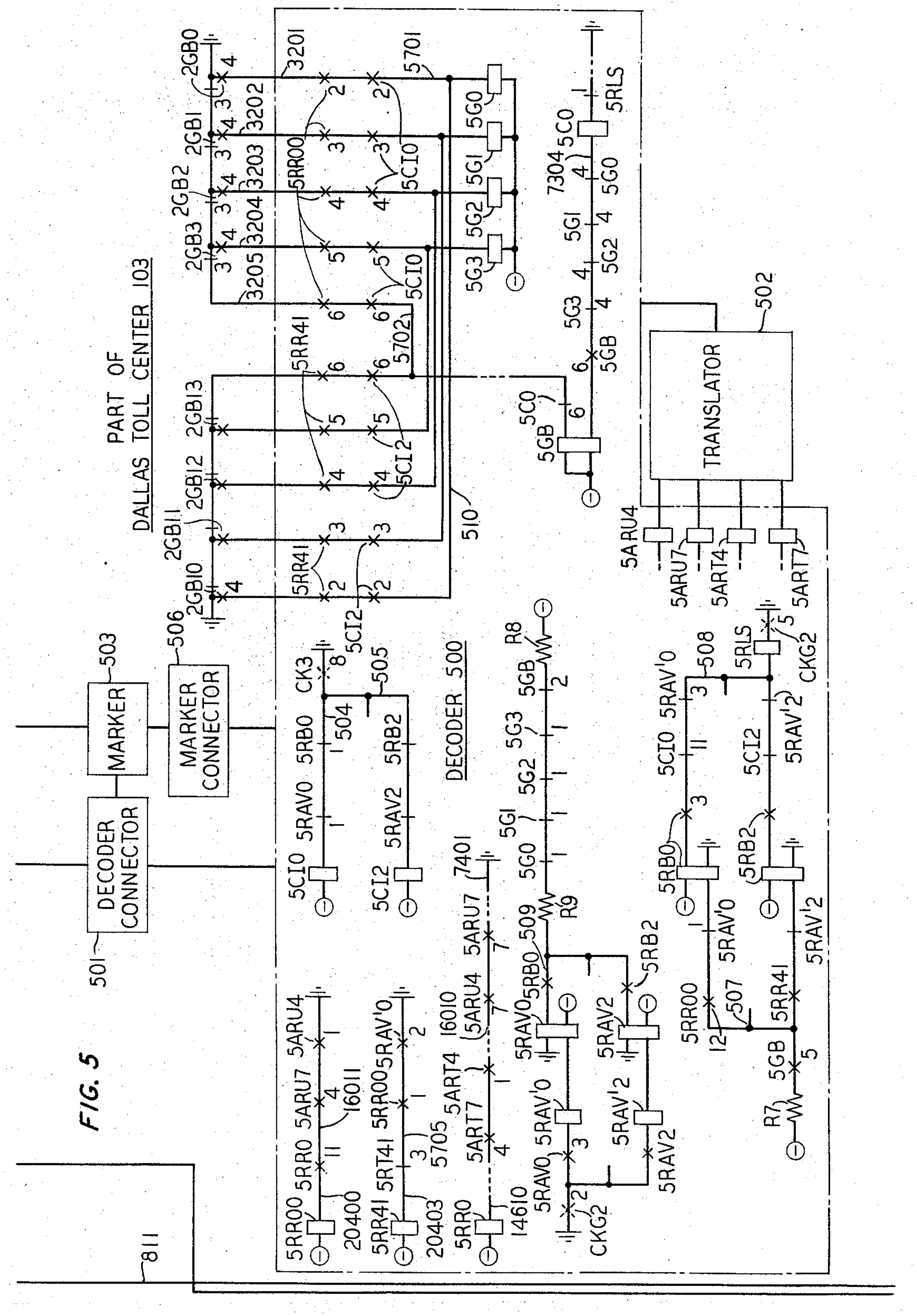
Figure 8:
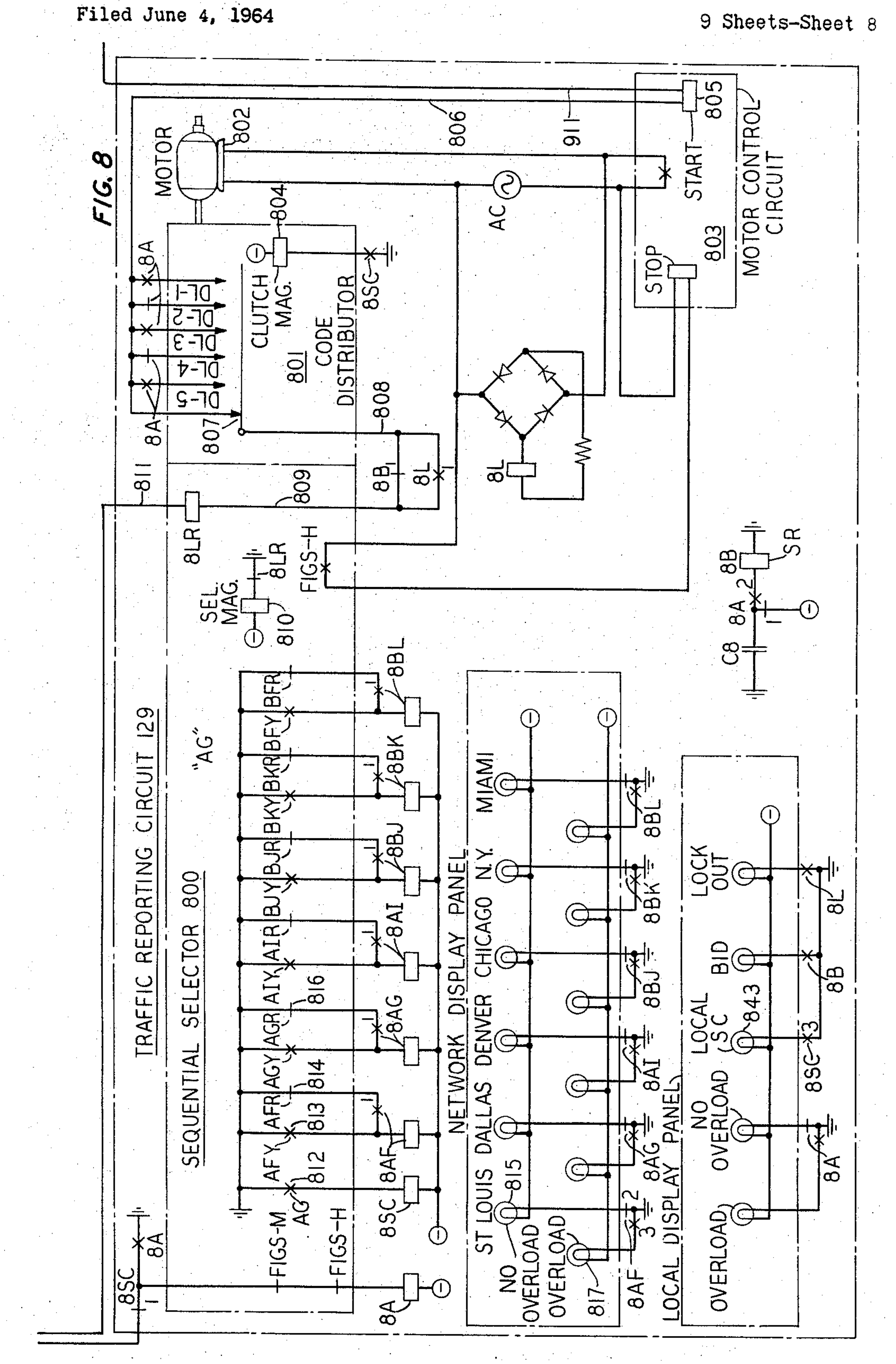

FIG. 2 shows the Denver toll center 102 serving local office 106 and a portion of Dallas toll center 103 which serves local office 107 and customer 111 while FIG. 5 shows the remaining portion of the Dallas toll center 103 and FIG. 8 shows the traffic reporting circuit 129 associated with the Dallas toll center.

Figure 3:
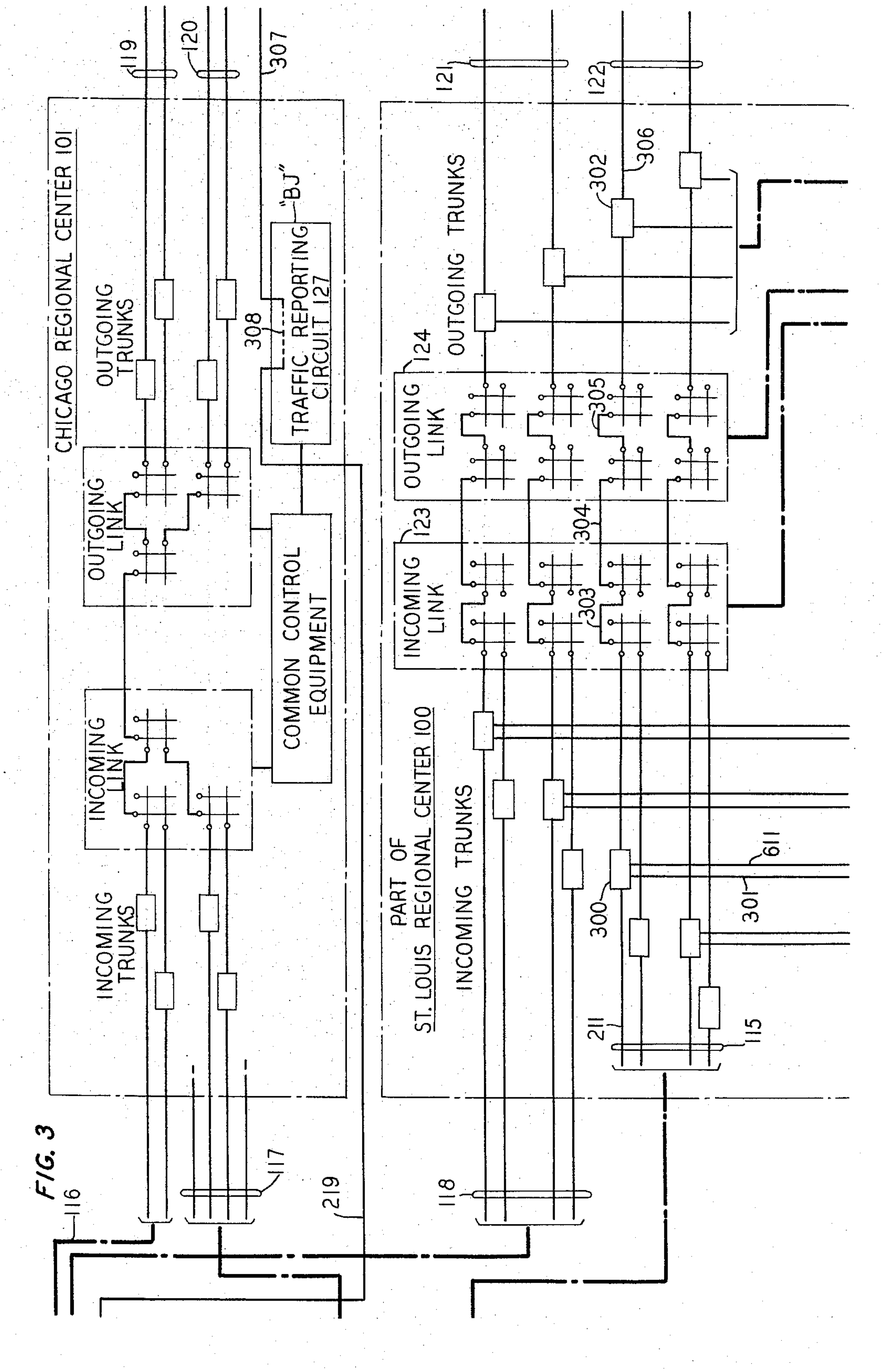
Figure 6:
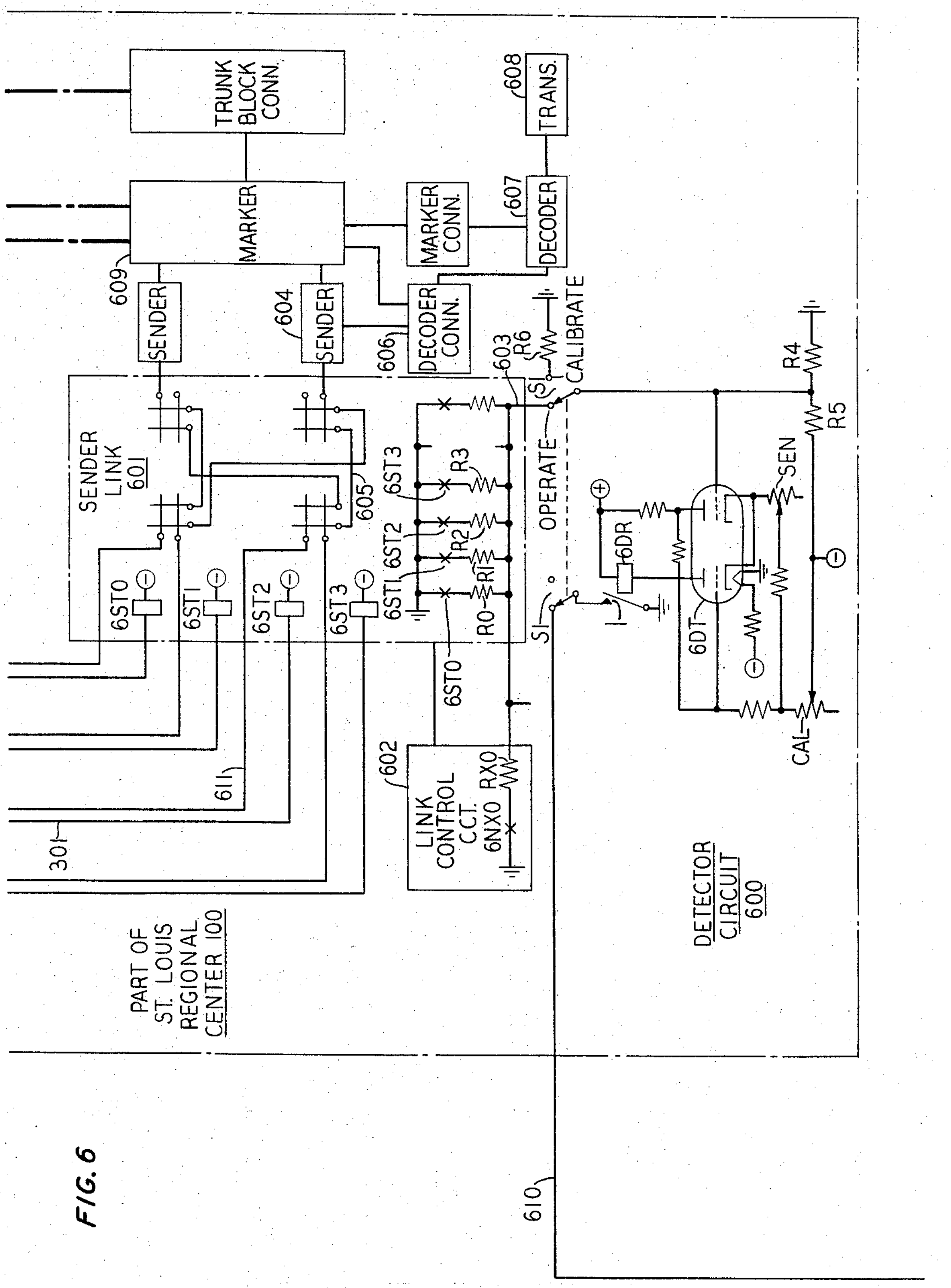
Figure 9:
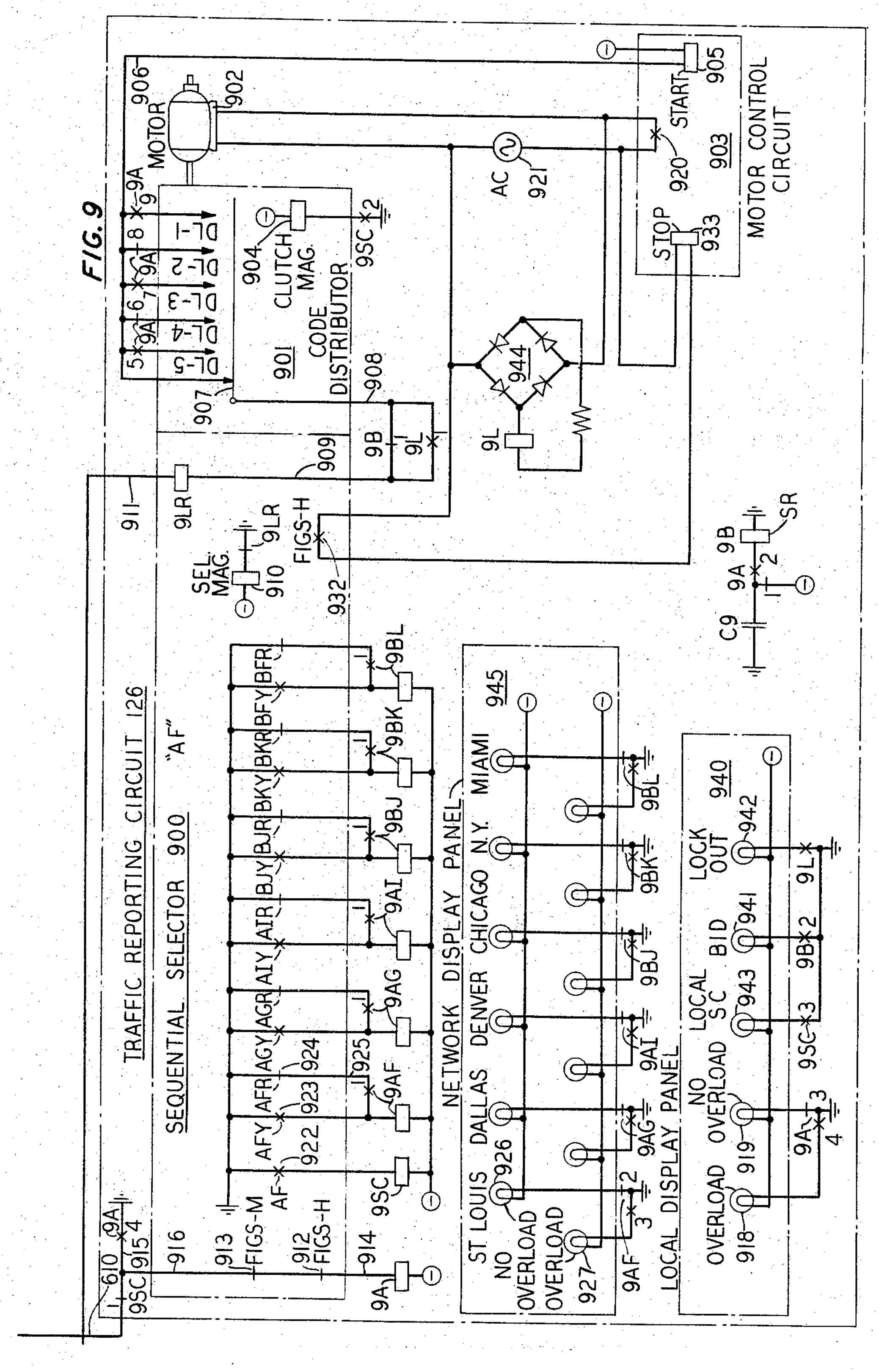

FIG. 3 shows the Chicago regional center 101 in block diagram form and part of the St. Louis regional center 100 while FIG. 6 shows the remaining portion of the St. Louis regional center, and FIG. 9 shows the traffic reporting circuit 126 associated with St. Louis.

Figure 4:
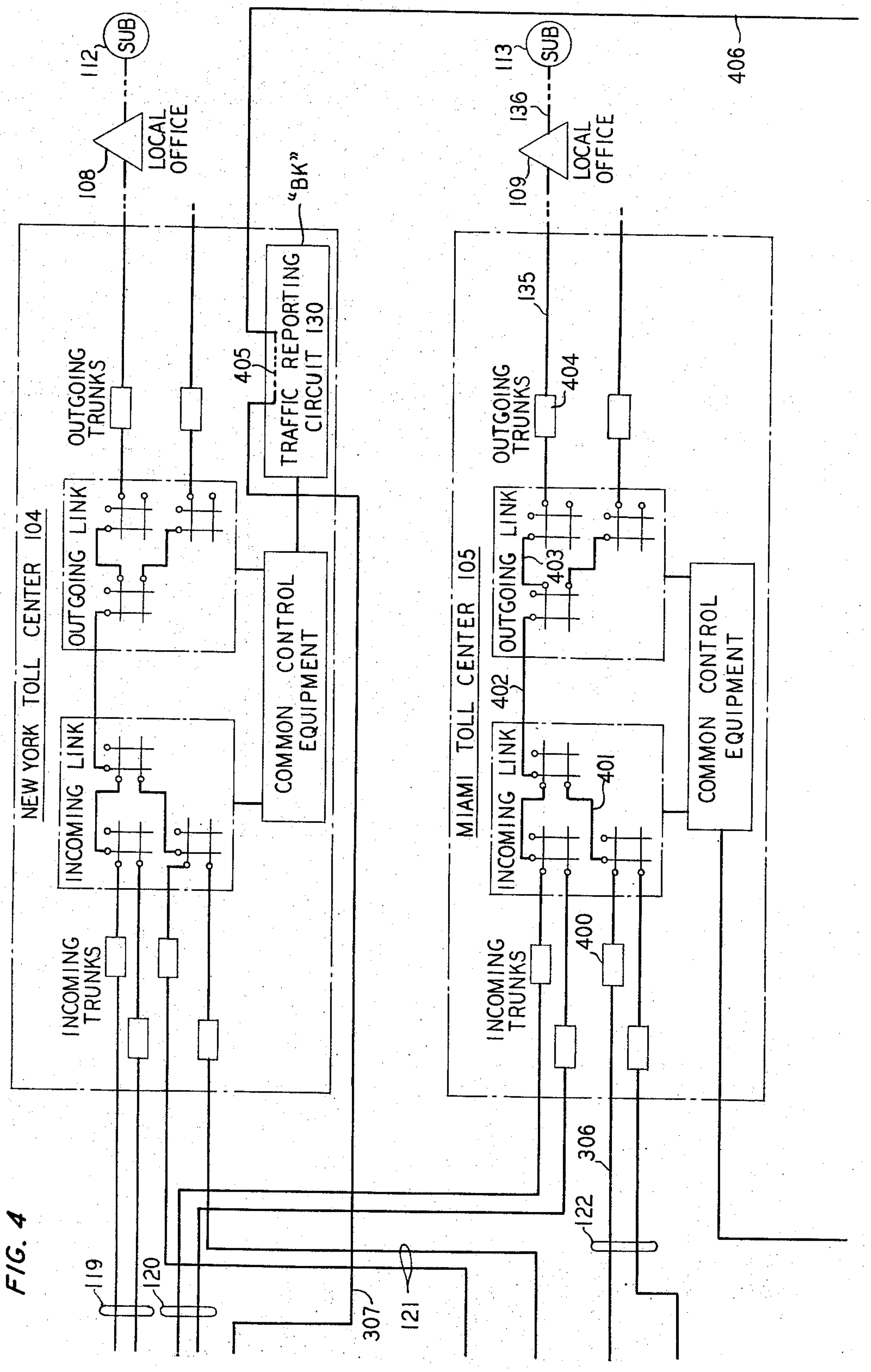
Figure 7:
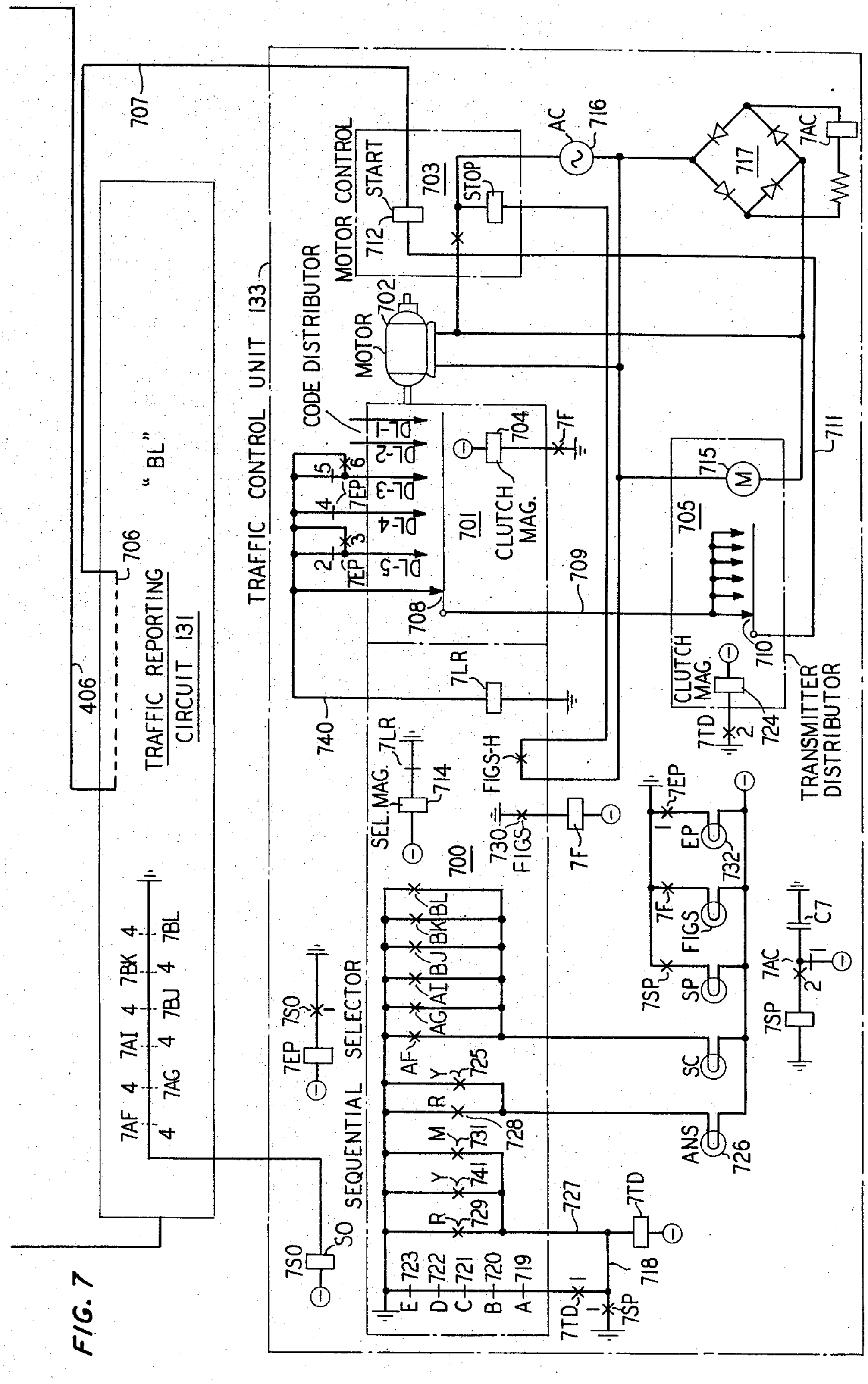

FIG. 4 shows the New York toll center 104 and the Miami toll center 105 serving their local offices 108 and 109, respectively, and FIG. 7 depicts the traffic control unit 133 for the entire network and the traffic reporting circuit 131 in block diagram form for the Miami toll center 105.

The toll centers and regional centers represented by the various figures herein can be any one of the many well-known switching systems. One example of a typical toll switching system is disclosed in Patent 2,868,884, granted to J. W. Gooderham et al. of Jan. 13, 1959, and the Gooderham et al. patent is hereby incorporated by reference as though fully disclosed herein.

Turning first to FIGS. 2 and 5, there is shown the Dallas toll center 103 which comprises incoming link 200 on which incoming trunks appear, outgoing link 201 on which outgoing trunks appear and various elements of common control equipment to be described in more detail below.

Local office 107 in FIG. 2 is connected over trunk conductors 202 to incoming trunk equipment 203 at Dallas which appears on incoming link 200 and sender link 204. Although only one trunk has been shown interconnecting a local office 107 with the Dallas toll center 103, it will be realized that many trunks may be provided between these and other switching centers and that the trunks represented herein may include wire facilities, carrier facilities or radio links and the like.

A further description of the local switching offices 106–109 need not be given herein for a full understanding of the invention. It will be understood that any of the well-known switching systems such as crossbar, step-by-step or the more recently developed electronic switching systems are equally suitable for this arrangement.

Incoming trunk equipment 203 at Dallas is connected over conductors 205 to sender link 204, and it is through sender link 204 and link control circuit 206 that incoming trunk 203 can be connected to one of the many available senders such as sender 207. More specifically, link control circuit 206 recognizes which incoming trunks are requesting service, tests and selects the proper type sender and then proceeds to close the appropriate crosspoints on sender link 204. Once connected to an incoming trunk, sender 207 functions to receive and store the digital information of the called customer as it is pulsed over trunk conductors 202 from the calling office 107. Sender 207 then passes the information received from the calling office to decoder 500 in FIG. 5 via decoder connector 501, and decoder 500 in conjunction with translator 502 utilizes this information to determine the proper routing for extending the call to the called customer.

Once the routing has been ascertained the various trunk groups in that route are surveyed by decoder 500 to ascertain which group of trunks has an idle trunk. The decoder then directs marker 503 to test the trunk group having at least one idle trunk by using trunk block connector 208 and thereby determine the particular trunks in that group that are idle. When the idle outgoing trunk such as trunk 209 is selected, the called number information is then outpulsed by sender 207 over trunk conductors 211 to the next adjacent switching center which is the St. Louis regional center 100 in the instant example.

For simplicity, it has been assumed that the Denver toll center 102 in FIG. 2, the New York and Miami toll centers 104 and 105 in FIG. 4, the Chicago regional center 101 and the St. Louis regional center 100 in FIGS. 3 and 6 are identical to the Dallas toll center 103, and no further description of the aforementioned common control switching equipment for these other switching points need be given at this time.

While it has been assumed that the St. Louis regional center 100 comprises the same type of switching equipment as the other control switching points, certain of the equipment at St. Louis has been shown in more detail to illustrate one exemplary method of monitoring the traffic conditions thereat in accordance with one feature of our invention.

Referring now to FIG. 6 there is shown a detector circuit 600 connected to sender link 601 and link control circuit 602 via conductor 603, and it is over conductor 603 that detector circuit 600 can monitor the number of incoming trunks awaiting service at St. Louis. While we have found it convenient to measure traffic loads by monitoring the sender link and link control circuits in this one illustrative embodiment of our invention, it is to be understood that similar measurements can be made at trunk circuits or at other common control equipment. This choice of equipment to be monitored, of course, depends on the nature of the traffic at a particular switching center and the type of switching equipment involved, and this is readily ascertainable using any of the well-know traffic measuring arrangements. It should also be realized that several detector circuits might be provided to simultaneously monitor different types of switching equipment at any of the control switching points of the network.

Each of the control switching points has a traffic reporting circuit, but only the traffic reporting circuits 126 and 129 for the St. Louis regional center and the Dallas toll center, respectively, have been shown in detail. The traffic reporting circuits are connected together over a common data link, and the reporting circuits are responsive to their associated detector circuits to transmit traffic data over this link.

The data link is also coupled to traffic control unit 133 at the Miami control center which functions to interrogate the control switching points for the purpose of ascertaining data indicative of the traffic conditions being experienced thereat.

We have found that certain well-known teletypewriter mechanisms are readily adaptable for use in the traffic reporting circuits and in the traffic control unit depicted herein. Of course, it will be apparent from the following description of these circuits that other instrumentalities may readily be employed therein by those skilled in the art without departing from the spirit and scope of our invention.

Turning first to FIG. 9 there is shown traffic reporting circuit 126 associated with the St. Louis regional center 100. For this illustrative embodiment it can be assumed that the traffic reporting circuits for the other control switching points are similar to the circuit shown in FIG. 9 except that each traffic reporting circuit has been assigned its own individual address code.

The traffic reporting circuit 126 comprises a sequential selector generally indicated by block 900 and a code distributor generally indicated by block 901, both of which are driven by motor 902. In this illustrative embodiment of the invention the traffic reporting circuits only function when adverse traffic conditions are experienced in the network, and therefore, the motor 902 has been put under control of motor control circuit 903 which responds to signals over the data link to start and stop motor 902.

The sequential selector shown in FIG. 9 can be any one of the many well-known teletypewriter selector mechanisms such as that disclosed in Patent 2,568,264, granted to W. J. Zenner of Sept. 18, 1951, and the Zenner patent is hereby incorporated by reference as though fully disclosed herein.

In the Zenner patent there is shown a sequential selector which is responsive to coded characters received over a telegraph line in the form of one of the well-known telegraph coding arrangements. Mechanisms within the sequential selector respond to the different code characters, and these mechanisms are arranged to open and close electric circuits upon the receipt of particular code characters when the characters are received in a predetermined sequence.

For example, it will be recalled from the general description, that each control switching point has been assigned a particular address code and that the code for the St. Louis regional center 100 is "AF." When traffic reporting circuit 126 is ready to receive data over the data link, motor 902 will be running to drive the sequential selector 900 and the receipt of the code character "A" immediately followed by code character "F" will momentarily close AF code contacts 922 in FIG. 9 to operate relay 9SC. Mechanical arrangements for operating the sequential selector code contacts have not been shown in detail herein since they are well known to the art and are disclosed in the afore-mentioned Zenner patent.

Traffic reporting circuit 126 also comprises code distributor 901 which is driven by motor 902 upon energization of clutch magnet 904. The code distributor is arranged to transmit code characters over the data link in accordance with the coding of distributor leads DL–1 through DL–5 in a well-known manner. A code distributor suitable for use in this system is similar to the distributor disclosed in Patent 2,262,012 to R. A. Lake of Nov. 11, 1941, and is hereby incorporated by reference as though fully disclosed herein. In the instant drawing the distributor leads of code distributor 901 are coded by contacts of relay 9A in a well-known manner instead of sensing mechanisms which read a perforated tape as shown in the Lake patent, supra.

Traffic reporting circuit 126 also comprises various relays and lamps the function of which will be described subsequently.

Turning now to FIG. 7 there is shown the traffic reporting circuit 131 for the Miami toll center and the traffic control unit 133 for the entire network. Although the traffic control unit 133 has been shown associated with the Miami toll switching center 105, it will be readily apparent that the traffic control unit can be located at any convenient switching center in the network.

Traffic control unit 133 comprises sequential selector 700 and code distributor 701 driven by motor 702 which is under control of a motor control circuit generally indicated by block 703. The sequential selector, code distributor motor and motor control circuit are similar to those previously described with respect to the traffic reporting circuit 126 in FIG. 9 except, of course, the coding requirements of the traffic control unit equipment will differ from the coding requirements of the traffic reporting circuits. Also included in the traffic control unit 133 is transmitter-distributor generally indicated by block 705. The transmitter-distributor 705 is a tape-controlled mechanism arranged to transmit coded characters over the data link in accordance with information previously punched on a tape and introduced into the reading mechanism of the transmitter-distributor.

A typical transmitter-distributor suitable for use in our arrangement is disclosed in the aforementioned Lake Patent 2,262,012.

It will be recalled from the general description that the traffic control unit functions, in response to a "bid" signal received over the data link, to interrogate each control switching point in the network by transmitting its corresponding adress code over the data link. The address code characters along with other control characters are, therefore, perforated on a tape which is fed into the transmitter-distributor 705. Specifically, the tape might be coded so that the transmitter-distributor 705 first transmits the following code sequences: LETTERS-LETTERS-LETTERS-CARRIAGE RETURN-LINE FEED-LETTERS. This sequence of characters is primarily used to prepare the circuit for operation, that is, if a page printer typing unit is also connected to the data link to provide a typewritten record of the overload control system operation, the foregoing characters are used to prepare the printer for operation.

Following the preliminary control characters, the transmitter-distributor 705 would be programmed by the perforated tape to transmit the address codes of the various control switching points as follows: AF–AG–AI–BJ–BK–BL followed by the code characters E and FIGURES, the function of which will be explained subsequently.

Each address code functions to interrogate the control switching point assigned thereto and informs the other switching offices as to the office currently being interrogated. The address codes for this exemplary embodiment have been selected to minimize the possibility of a "code" being falsely generated by "hits" or other similar electrical disturbances on the data link, but of course, other coding schemes can be utilized by those skilled in the art without departing from the spirit and scope of the invention.

A better understanding of the arrangement contemplated will be realized from the ensuing description with respect to the establishment of a typical call over the switching network when the network is experiencing normal traffic conditions followed by a description of a similar call wherein adverse traffic conditions are encountered.

*Call from Dallas to Miami via St. Louis*

Let it be assumed that customer 11 in the Dallas toll center area wishes to call customer 113 in the Miami toll center area and also let it be assumed that there are available idle trunks in the various routes interconnecting the switching centers as shown.

Customer 111 in the Dallas area (FIG. 2) wishing to call customer 113 in the Miami area (FIG. 4) lifts his telephone receiver and dials into local office 107 information as to the area code for Miami followed by the office code for local office 109 serving the called customer and the telephone number assigned to customer 113. As previously assumed with respect to the general description, this information might consist of ten digits, such as 305–CH3–1000 wherein the first three digits represent the Miami area code, the next three digits are the office code for local office 109 in the Miami area, and the last four digits represent the telephone number of customer 113.

The switching equipment (not shown) at local office 107 recognizes this area code as one assigned to a foreign area and selects a trunk such as trunk 202 to its "home tandem" office which is the Dallas toll center 103 in the instant example. When trunk 202 is seized by local office 107, incoming trunk equipment 203 is actuated and a signal is sent over conductors 205 to sender link 204 and to link control circuit 206 requesting that the proper type sender be attached to incoming trunk 203. An idle sender is chosen, the select magnets of the proper switch levels are operated and the hold magnets of the proper verticals on both the primary link switch and the secondary link switch of sender link 204 are operated by link control circuit 206 thus connecting incoming trunk 203 over the conductors 205, link 221 and conductors 212 to sender 207. When sender 207 is connected to trunk 203, a signal is transmitted back over trunk conductors 202 to local office 107 requesting the local office to outpulse the ten digits of information stored therein.

After sender 207 receives the ten digits outpulsed from local office 107, sender 207 connects itself to decoder 500 in FIG. 5 via dcoder connector 501. Decoder 500 functions in conjunction with translator 502 to translate the area code and called office code into the proper instructions so that the appropriate route can be selected.

Decoder 500 shown in FIG. 5 is illustratively of the type disclosed in the aforementioned Gooderham et al. patent, and wherever possible the reference designations used in that patent have been retained herein, except that the letter designations denoting certain functional characteristics of the equipment in Gooderham et al. have been prefixed herein by a number indicating the figure of the instant drawing where the equipment is located.

In the Gooderham et al. patent it was shown that each decoder is an assembly of control circuits for enabling the seizure of a translator which can translate the information concerning the destination of the desired call which is received from the sender, into information required by a marker to extend the desired connection to another control switching point. To enable the translation of information concerning the destination of a desired call into directive information which enables the marker to control the establishment of a call, a card translator was disclosed in the Gooderham et al. patent. For simplicity, a similar translator generally represented by block diagram 502, has been shown herein. It will be understood that a complete description of the translator and its capabilities can be found in the aforementioned Gooderham et al. patent. However, a brief description of the translator will be helpful at this time for a better understanding of the network arrangement contemplated herein.

As disclosed in the Gooderham et al. patent, the translator comprises a plurality of cards upon which various bits of information, such as routing instructions, trunk locations, class of service, etc. are stored. Ordinarily a selection of the first card is determined by the area code digits received from the sender but the local office code digits may also be used. Provision is made for various routing instructions such as card-to-card, card-to-relay, relay-to-relay, etc., but for ease of illustration the description with respect to the instant invention will be limited to a call handled on a relay-to-relay basis, and it will be obvious to those skilled in the art that this invention is also applicable to calls handled in various other ways.

On a call which is handled on a relay-to-relay basis as set forth in the Gooderham et al. patent, the first card selected in the translator will contain an "alternate-route pattern number" which enables the decoder to ascertain the proper route relay for the first choice trunk group.

Each route relay such as 5RR00 in FIG. 5 is arranged to cut in four subgroup chain leads for ascertaining the idle trunk condition in any one of four corresponding subgroups of trunks, and the subgroups may contain as many as forty trunks each. If an idle trunk is found in the first subgroup, the same card which was selected by the translator for determining the route relay can also be read to determine the location of the trunks in this subgroup, and this information is passed to the marker for establishing a connection to one of the idle trunks. If an idle trunk is found in one of the other subgroups, a new card corresponding to the subgroup having the idle trunk must be read by translator 502, and the trunk location information on this card is then forwarded to the marker. If no idle trunks are found in any of the four subgroups of the first choice trunk group, the decoder "route advances" by operating a route relay associated with an alternate-route and thereafter test sthe subgroups of trunks associated with the alternate-route trunk group in the manner just described.

Returning now to the description of the establishment of a call from customer 111 in FIG. 2 to customer 113 in FIG. 4, it will be recalled that local office 107 had outpulsed the ten digits (305–CH3–1000) into toll center 103 and that these digits were registered on register relays (not shown) in sender 207 and then forwarded to the decoder 500 in FIG. 5 through decoder connector 501.

Let it be assumed that all routes outgoing from the Dallas toll center 103 have idle trunks therein and that the route instructions for Miami are to be ascertained from the route relay tree, that is, on a relay-to-relay basis. When decoder 500 receives the area code and the called local office code from sender 207, it primes translator 502 with this information. Using the area code and local office code a card is selected in translator 502 upon which the alternate-route pattern number for Miami is punched, and when this card is read the information contained thereon is transmitted to the decoder in the form of a two-digit number. Let it be assumed that the alternate-route pattern number for the call being described is "00," and therefore, relays 5ART7, 5ART4, 5ARU7 and 5ARU4 in decoder 500 would be operated by translator 502 thereby indicating the alternate route pattern number on a two-out-of-five basis. With these relays operated a circuit including battery, the winding of relay 5RR0, conductor 14610, contacts 4 of relay 5ART7, contacts 1 of relay 5ART4, conductor 16010, contacts 7 of relays 5ARU4 and 5ARU7, conductor 7401 and ground, is completed for operating relay 5RR0. Relay 5RR0, in operating, completes a circuit for operating route relay 5RR00. This circuit includes battery through the winding of relay 5RR00, conductor 20400, contacts 11 of relay 5RR0, conductor 16011, contacts 4 of relay 5ARU7 and contacts 1 of relay 5ARU4 to ground.

Prior to the operation of the above relays when decoder 500 was initially seized by sender 207, certain check relays such as relays CK3 and CKG2 were operated to prepare decoder 500 for operation. While only the contacts of these relays have been shown in FIG. 5, it is to be understood that these relays were operated in accordance with the description given in the aforementioned Gooderham et al. patent, and no further description of these relays and their function need be given herein for a compelte understanding of the instant invention. With relay CK3 operated, a circuit is closed from ground through its contacts 8, over conductor 504, through contacts 1 of relay 5RB0, contacts 1 of relay 5RAV0 and through the winding of relay 5CI0 to battery operating relay 5CI0. A similar path can be traced from ground through contacts 8 of relay CK3 and over conductor 505 for operating relay 5CI2.

With relays 5RR00 and 5CI0 operated a circuit is prepared for testing for idle trunks in the subgroups of the first choice trunk group 115 to the Miami toll center area.

The trunks in a particular route, as shown in the Gooderham et al. patent, are arranged in four subgroups each having as many as forty trunks, with a group busy chain relay for each subgroup. A typical group busy arrangement is shown in FIG. 2 wherein relays 2GB0–2GB3 are associated with the four subgroups of trunks in the first choice trunk group 115 to the St. Louis regional center and relays 2GB10–2GB13 are associated with the four subgroups of trunks in the alternate trunk group 117 to the Chicago regional center. Only one trunk in each subgroup has been shown, and these trunks are cross-connected to their corresponding group busy (2GB–) relays. When the outgoing trunk equipment, such as equipment 209 is idle, it extends ground over conductor 213, cross-connection 214, through normal contacts 4 of relay 8AF and through the winding of relay 2GB0 to battery holding relay 2GB0 operated. Similarly, the other trunks in subgroup 0 are cross-connected to relay 2GB0 extending their grounds in parallel with the ground from trunk equipment 209, and as long as one trunk in this subgroup is idle, relay 2GB0 will be held operated. As each trunk is taken for use, ground is removed from its corresponding lead connected to the 2GB– relay, and when all trunks in a particular subgroup are in use, the corresponding 2GB– relay will be released indicating an all-trunk-busy condition in that particular subgroup.

Since it has been assumed that each subgroup in trunk group 115 has at least one idle trunk, relays 2GB0–2GB3 will be operated, and relay 2GB0 extends ground through its contacts 4 in FIG. 5, over conductor 3201, through contacts 2 of relay 5RR00, contacts 2 of relay 5CI0, over conductor 5701 and through the winding of relay 5G0 to battery, operating relay 5G0. Relay 5G0, in operating, informs decoder 500 that there is an idle trunk in the subgroup 0 of the first choice trunk group 115 and that the trunk location information for the subgroup 0 trunks can be obtained from the first card that was read in translator 502.

Once the trunk location information, along with various other items of information such as code conversion, class of service, etc. is forwarded from the decoder 500 through marker connector 506 to marker 503, decoder 500 can release. Marker 503 then assumes control of the call and proceeds to select and test for an idle trunk in subgroup 0 of trunk group 115 through the facilities of trunk block connector 208.

Having selected an idle trunk such as trunk 209, marker 503 then identifies the incoming link 200 on which the incoming trunk 203 appears and proceeds to establish a talking path between incoming trunk 203 and outgoing trunk 209 utilizing the links 215, 216 and 217 in the toll center switch train.

Marker 503, decoder connector 501, and trunk block connector 208 are then permitted to release, and sender 207 assumes control of the call waiting for an idle sender to be attached to the trunk at the St. Louis regional center.

When trunk equipment 209 at the Dallas toll center 103 in FIG. 2 was seized, a signal was transmitted over trunk conductors 211 to trunk equipment 300 in FIG. 3 at the St. Louis regional center 100. This signal requests that the common control equipment at the St. Louis regional center attach an idle sender to the trunk equipment 300 to receive the information to be outpulsed from the Dallas toll center.

In a manner similar to that described with respect to the connection of a sender to trunk 203 at the Dallas toll center, trunk equipment 300 bids for an idle sender by signaling over conductor 301 to operate group start relay 6ST2 in FIG. 6.

In the switching system being described each sender link can accommodate 100 trunks which are divided into ten groups having ten trunks each. Each group of ten trunks is associated with a group start relay (6ST–), and therefore, each sender link may have as many as ten 6ST– relays. The functions and operations of sender link 601 and link control circuit 602 in selecting an idle sender such as sender 604, have been briefly described with respect to similar equipment at the Dallas toll center and are more fully described in the Gooderham et al. Patent 2,868,884 or in Patent 2,293,191, of A. J. Busch et al. of Aug. 18, 1942. A full description of these operations need not be given herein for a full understanding of the instant invention. Instead, let it be assumed that sender 604 has been connected to trunk 300 over link 605 on sender link 601 and conductors 611, and when sender 604 is attached a "start pulse" signal is transmitted over this path and back over trunk conductors 211 and to sender 207 which is also connected to the trunk at the Dallas toll center as previously described. Sender 207 receives the "start-pulse" signal and proceeds to outpulse the ten digits (305–CH3–1000) over this path to sender 604 at the St. Louis regional center where the digits are registered on sender registration relays not shown. Sender 207 at Dallas can then release to serve other calls in the Dallas toll center area.

Upon receipts of these ten digits, sender 604 is connected through decoder connector 606 to decoder 607 where the proper translator 608 is interrogated to determine the routing instructions to the Miami area.

In the instant example, calls through the St. Louis regional center 100 to Miami are routed over trunk group 122, and decoder 607 ascertains this information from translator 608 and directs marker 609 to select an idle trunk such as trunk 302 in trunk group 122. Marker 609 then connects outgoing trunk 302 with incoming trunk 300 via links 303, 304 and 305 on the incoming and outgoing links of the St. Louis switch train. Marker 609 also receives the necessary information to be outpulsed to Miami from decoder 607, and marker 609 can then assume control of the call permitting decoder 607 to release. The marker then forwards the information to the sender 604 and releases permitting sender 604 to assume control of the call.

Once sender 604 has been connected to trunk 302, a signal is transmitted over trunk conductors 306 to the Miami toll center 105 requesting that an idle sender be attached to the trunk at Miami in order to receive the information to be outpulsed from sender 604 in St. Louis. Since the St. Louis regional center 100 routes calls directly to the Miami area, the area code (305) for Miami can be deleted by the St. Louis regional center, and only the local office code CH3 and the called number 1000 need be outpulsed over trunk conductors 306 to the Miami toll center. Had it been necessary to route the call through other intermediate control switching points between St. Louis and Miami, the call would have been forwarded to each successive switching point in the same manner as the call described above with respect to the connection between the Dallas toll center and the St. Louis regional center.

At the Miami toll center 105 a connection including links 401, 402 and 403 is established to outgoing trunk 404 which is connected to local office 109 over trunk conductors 135, and the four digits (1000) of the called customer 113 are outpulsed over conductors 135 to local office 109 causing the common control equipment thereat to establish a connection over line conductors 136 to the called customer 113.

A ringing signal is then transmitted to customer 113 by equipment at local office 109, and when customer 113 responds by lifting his telephone receiver, customer 113 can converse with calling customer 111 over a communication path including (in FIG. 2) subscriber line conductors 134, a switch train through local office 107, trunk conductors 202 to the Dallas toll center 103, links 215–217 in the Dallas toll center switch train and trunk conductors 211 to the St. Louis regional center in FIG. 3, over links 303–305 in the St. Louis switch train, over trunk conductors 306 to the Miami toll center in FIG. 4, thence over links 401–403 in the Miami toll center, over trunk conductors 135, through the switch train of local office 109 and over trunk and line conductors 135 and 136, respectively, to called customer 113.

*Traffic control features*

In the above description of the establishment of a call over the network from customer 111 to customer 113, it was assumed that the network was experiencing normal traffic conditions and that idle trunks were available in all of the first choice trunk groups. Under normal traffic conditions the traffic reporting circuits at each control switching point and the traffic control unit 133 at the Miami toll center are standing by and no traffic data is being transmitted over the data link.

The sequential selectors, the distributors and the motor control circuits of all traffic reporting circuits are linked in a series circuit with each other and with similar equipment in the traffic control unit 133 via the data link. Referring first to FIG. 9 this series circuit can be traced beginning with battery through the winding of start magnet 905 in motor control circuit 903, over conductor 906 and through normal contacts 907 of code distributor 901, over conductor 908, through normal contacts 1 of relay 9B, over conductor 909 and through the winding of line relay 9LR and over data link conductor 911 to traffic reporting circuit 129 in FIG. 8. In traffic reporting circuit 129 the series circuit is extended from data link conductor 911, through the winding of start magnet 805 in motor control circuit 803, over conductor 806, through normal contacts 807 of code distributor 801, over conductor 808, through contacts 1 of relay 8B, over conductor 809, through the winding of line relay 8LR and over data link conductor 811 which extends through FIG. 5 to traffic reporting circuit 128 in FIG. 2. Since the traffic reporting circuits for Denver, Chicago, New York, and Miami have not been shown in detail, this portion of the data link series circuit will not be traced. Instead, let it be assumed that the traffic reporting circuits for these control switching points are identical to those shown in FIG. 8 or FIG. 9 and the series circuits traced through traffic reporting circuits 128, 127, 130 and 131 are represented by the dotted lines shown in the block diagrams for each of these traffic reporting circuits.

Having traced the series circuit from traffic reporting circuit 129 over data link conductor 811 to Denver, the circuit is extended over a series circuit represented by dotted line 218 in traffic reporting circuit 128 and over the data link conductor 219 to traffic reporting circuit 127 in FIG. 3, through a series circuit represented by dotted line 308 and over data link conductor 307 to traffic reporting circuit 130 in FIG. 4, through the series circuit represented by dotted line 405 and over data link conductor 406 to traffic reporting circuit 131 at Miami, through the series circuit represented by dotted line 706 and over conductor 707 to traffic control unit 133.

In traffic control unit 133 the circuit can be traced from conductor 707, through the winding of start magnet 712 in motor control circuit 703, over conductor 711, through normal contacts 710 of transmitter-distributor 705, over conductor 709, through normal contacts 708 of code distributor 701 over conductor 740 and through the winding of line relay 7LR to ground.

The previously traced series path includes the start magnets of all motor control circuits for traffic reporting circuits 126–131 and the motor control circuit of traffic control unit 133, and these start magnets are held energized disconnecting the alternating-current supply from their respective motors.

The motor control circuit used herein can be any one of the many well-known circuits. An example of a motor control circuit suitable for use with our system is disclosed in the O. A. Morgenstern Patent 1,964,268 of June 26, 1934 and is hereby incorporated by reference as though fully disclosed herein.

In the above-identified Morgenstern patent an arrangement is disclosed for controlling the starting and stopping of teletypewriter motors at remote locations. The arrangement includes a start magnet in series with the telegraph line, and the start magnet remains energized as long as the line remains closed. An alternating-current circuit is completed to start the teletypewriter motor upon the momentary opening and subsequent reclosure of the telegraph line circuit, and once closed, the alternating-current circuit remains closed until a stop magnet is energized upon the receipt of a predetermined sequence of code characters over the telegraph line. More specifically, when the telegraph line momentarily opens, the contacts which complete the alternating-current circuit for the motors are unlatched and permitted to close upon the subsequent reclosure of the telegraph line. The teletypewriter motors will continue to run unaffected by the transmission of code characters over the telegraph line until a particular sequence of characters is received to energize the stop magnet. In our illustrative embodiment the stop magnet is arranged to operate when the code character figures followed by the code character H is received.

Since all of the traffic reporting circuits are linked by the above-traced series line circuit, the momentary interruption of this circuit at any one of the control switching points is recognized as a "bid" signal to actuate all motor control circuits turning on their respective motors and also causing the traffic control unit 133 to begin interrogating the various control switching points.

To illustrate how traffic conditions at certain switching centers are reported to the switching centers in the entire network, let it be assumed that the St. Louis regional center depicted in FIGS. 3 and 6 is being subjected to an abnormal traffic surge, and although trunks may be available to and from the St. Louis switching center, the common equipment at St. Louis is overburdened and calls trying to gain access to St. Louis are experiencing a longer waiting interval for common equipment thereat.

Rather than permit futile attempts by other centers trying to gain access to the St. Louis regional center during such an overload, it is desirous to notify the control switching points in the network of this condition so that these other switching points can select other available routes. By directing these switching points to other routes, the common equipment at these switching points will not be held unnecessarily for long periods while waiting for common control equipment to become available at the overloaded St. Louis office.

If certain steps were not taken to divert traffic from the St. Louis regional center when this regional center begins to experience an overload, those toll centers having first choice trunk groups to St. Louis would continue to select idle trunks in these groups until all of the trunks to St. Louis were busy thus adding to the adverse situation which already exists at St. Louis. Moreover, common control equipment such as senders at these toll centers, which are attached to the trunks outgoing to St. Louis, will begin "timing out" while waiting for common control equipment at St. Louis to become available. The sender time-out arrangements are well known in the art and generally result in the return of an overflow or reorder signal to the calling customer who must then make another attempt to complete his call.

It can readily be seen, therefore, that if such a situation is allowed to persist uncontrolled, additional traffic at the toll centers is falsely generated by customers making numerous second attempts to complete their calls. The result of this increase in traffic at the toll centers naturally degrades service in the entire toll center area since numerous other calls waiting to be switched through these toll centers are also being inefficiently served by the toll center common control equipment.

In accordance with an aspect of our invention, detector circuits have been located at the various control switching points to monitor the traffic conditions at each control switching point. For example, in this illustrative embodiment detector circuit 600 in FIG. 6 has been shown connected over conductor 603 to sender link 601 and link control circuit 602 to effectively monitor the level of traffic waiting for service by the common control equipment at St. Louis.

Detector circuit 600 comprises a trigger circuit including tube 6DT and a detector relay 6DR which is operated by tube 6DT to signal the traffic reporting circuit 126 associated with the St. Louis regional center. It should be understood that the detector arrangement shown herein is merely illustrative, and it will be obvious to those skilled in the art that many other detector circuits can be substituted for the arrangement shown herein without departing from the spirit and scope of the instant invention. It should also be realized that detector circuit 600 or similar detector circuits can be arranged to monitor other control or trunk equipment at St. Louis. The selection of equipment to be monitored for ascertaining the traffic conditions at a particular switching point will, of course, depend on the particular type of switching system involved.

Turning now to FIG. 6 for a more detailed description of detector circuit 600, it can be seen that the potential on the grid circuit of the right section of tube 6DT is dependent on the value of resistances R4 and R5 and the number of resistances RX0 and R0–R3 that are connected to the grid by their corresponding relays 6NX0 and 6ST0–6ST3. It will be recalled that the operation of a group start relay (6ST–) is an indication that one of the incoming trunks in the corresponding group of trunks has been seized and is requesting that a link control circuit select and attach a sender to the incoming trunk. The 6NX– relays, on the other hand, indicate those link control circuits that are busy interconnecting trunks and senders at the various sender links. Of course, it will be realized that if other equipment is monitored, relays in that equipment similar to the 6ST– or 6NX– relays can be provided for controlling the bias on tube 6DT. Thus, the more 6ST– or 6NX– relays that are operated, the less negative the grid of tube 6DT becomes until the right section of tube 6DT is triggered "on," that is, it conducts, turning off the left section.

The adjustment of the "triggering point" of tube 6DT is accomplished by operating switch S1 to the calibrate position to connect resistance R6 to the grid circuit of tube 6DT. The value of resistance R6 is selected to simulate the desired number of 6ST– and 6NX– relays on which the trigger circuit is to operate and, of course, the selection of the number of relays is determined on the basis of previous traffic studies for a given switching center.

With switch S1 operated to the "calibrate" position, the calibrate potentiometer CAL can be adjusted to trigger tube 6DT, and when the right section of tube 6DT is conducting it turns off the left section to release relay 6DR. The calibration potentiometer CAL is then "backed off" just enough to prevent the right section of tube 6DT from conducting as indicated by the operation of relay 6DR. If, however, it is found that a considerable wide margin of adjustment must be made to the calibration potentiometer CAL, in order to change the circuit from "on" to "off," sensitivity potentiometer SEN can be adjusted to compensate for this. After satisfactory adjustment has been made, switch S1 is restored to its "operate" position thereby connecting detector circuit 600 over conductor 603 to sender link 601 and link control circuit 602.

Having priorly adjusted detector circuit 600, the right section of tube 6DT will now be "triggered on" when a predetermined number of 6ST– and 6NX– relays are operated to indicate that an abnormal amount of traffic is waiting for common control equipment at St. Louis.

Let it now be assumed that many trunks are waiting for service at the St. Louis regional center 100 and that these trunks have their corresponding 6ST– relays operated, and also let it be assumed that link control circuits are busy controlling the connections between senders and trunks so that the number of operated 6NX– relays in combination with the operated 6ST– relays changes the grid bias on tube 6DT permitting the right section of tube 6DT to conduct. When the right section of tube 6DT conducts the left section is turned off and relay 6DR releases to extend ground through its contacts 1, through contacts of switch S1 and over conductor 610 to traffic reporting circuit 126 in FIG. 9, through normal contacts 1 of relay 9SC, over conductor 916, through normal contacts 913 and 912 in sequential selector 900, over conductor 914 and through the winding of relay 9A to battery operating relay 9A. When relay 9A operates it closes its contacts 4 to extend ground over conductor 915 to conductor 916 and over the previously traced operating circuit for relay 9A to hold relay 9A operated. In operating relay 9A opens its contacts 3 to extinguish no overload lamp 919 and closes its contacts 4 to light overload lamp 918 on local display panel 940. Relay 9A, in operating, also closes its contacts 5, 7 and 9 to provide closures on distributor lead DL–5, DL–3 and DL–1 and thereby "coding" the distributor to furnish an "overload" answer-back signal when traffic reporting circuit 126 is interrogated by the traffic control unit 133 at Miami. Relay 9A also actuates its transfer contacts 1 and 2 to disconnect the charging circuit from capacitor C9 and connect capacitor C9 to the winding of bid relay 9B. Capacitor C9 discharges through the winding of slow-release relay 9B causing relay 9B to momentarily operate.

When relay 9B momentarily operates it closes its contacts 2 to light lamp 941 on local display panel 940, and opens its contacts 1 to momentarily interrupt the previously-traced series data link circuit thereby releasing the previously-energized start magnets in all motor control circuits. For example, start magnet 905 in motor control circuit 903 is de-energized to unlatch contacts 920. Contacts 920 cannot operate, however, until the data link series circuit is again closed by the release of slow-release relay 9B. When slow-release relay 9B releases it recloses its contacts 1 to complete the series data link circuit and energize start magnet 905. Having once unlatched contacts 920, the subsequent energization of start magnet 905 causes contacts 920 to close and connect the alternating-current supply 921 to motor 902 and to full-wave rectifier 944.

The connection of alternating current to the full-wave rectifier 944 completes a circuit for operating lockout relay 9L and relay 9L closes its contacts 1 in parallel with contacts 1 of relay 9B to prevent the data link from being interrupted by subsequent "bid" signals while data is being transmitted to each of the control switching points. Relay 9L also closes its contacts 2 to light lockout lamp 942 on the local display panel 940.

The momentary opening of the data link series circuit causes all other motor control circuits to be actuated and relays similar to relay 9L in each of the other traffic reporting circuits to operate thus preparing each control switching point for the reception of traffic data.

*Polling of control switching points*

At the traffic control unit 133 in FIG. 7, motor control circuit 703 was also actuated by the momentary interruption of the data link to start motor 702 which drives sequential selector 700 and code distributor 701. Motor control circuit 703 also starts motor 715 of tape distributor 705, and connects alternating-current supply 716 through full-wave rectifier 717 to operate relay 7AC.

When relay 7AC operates it actuates its transfer contacts 1 and 2 to disconnect the charging circuit from capacitor C7 and connect capacitor C7 to the winding of start poll relay 7SP. Capacitor C7 discharges through the winding of relay 7SP to momentarily operate relay 7SP, and relay 7SP extends ground through its contacts 1, over conductor 718 and through the winding of relay 7TD to battery, operating relay 7TD. Relay 7TD operates and locks through its contacts 1 and through normal contacts 719–723 to ground in sequential selector 700. Relay 7TD also close its contacts 2 to complete an obvious operating circuit for clutch magnet 724 in transmitter-distributor 705.

It will be recalled from the previous description that transmitter-distributor 705 is arranged to transmit code characters over the data link in accordance with information perforated on a paper tape which is fed into the transmitter-distributor. In this illustrative embodiment the tape being fed to transmitter-distributor 705 is perforated with preliminary control information followed by the address code of the first control switching point to be interrogated. The preliminary control information comprises the characters LETTERS - LETTERS - LETTERS-CARRIAGE RETURN-LINE FEED-LETTERS. This information is used to prepare a page printer typing unit for operation should such a unit be connected to the data link for the purpose of producing a typewritten page of the data to be subsequently transmitted over the link.

Following the transmission of the aforementioned characters, the first address code is transmitted. More specifically, the character A is transmitted over the data link to actuate the proper mechanisms in the sequential selectors at each control switching point. The receipt of the character A by sequential selector 700 of the traffic control unit 133 opens code contacts 719 in that sequential selector, and contacts 719 interrupt the locking circuit for relay 7TD which releases. Relay 7TD, in releasing, interrupts the operating circuit for clutch magnet 724 in transmitter-distributor 705 to stop the transmitter-distributor. Transmitter-distributor 705, however, is arranged to transmit one additional character during the release of clutch magnet 724, and while clutch magnet 724 is releasing the character F is transmitted over the data link and received by all sequential selectors. The transmitter-distributor 705 then comes to rest awaiting the "answer-back" signal from the St. Louis control switching point whose address code is "AF."

Turning now to FIG. 9 and the traffic reporting circuit 126 associated with St. Louis, line relay 9LR in sequential selector 900 responds to the sequence of characters A–F and operates select magnet 910 accordingly, and select magnet 910, by virtue of mechanical arrangements not shown, momentarily closes contacts 922 to momentarily operate relay 9SC. Relay 9SC closes its contacts 3 to light the local SC lamp 943 on local display panel 940 indicating that the office associated with the traffic reporting circuit 126 is currently being interrogated.

Relay 9SC, in operating, also closes its contacts 2 to momentarily operate clutch magnet 904 in code distributor 901 and thereby transmit one character over the data link in accordance with the information coded on the distributor leads DL–1 through DL–5. It will be recalled that the DL– leads were coded in accordance with the operated or released condition of relay 9A. With relay 9A operated by detector circuit 600, distributor leads DL–1, DL–3 and DL–5 are coded so that the character Y will be transmitted over the data link to indicate an "overload" condition at the particular offce being interrogated. If, however, relay 9A is released, distributor leads DL–2 and DL–4 are coded so that the character R is transmitted over the data link indicating that the office being interrogated is not overloaded.

Since it has been assumed that an overload was detected at the St. Louis regional center, and that relay 9A associated therewith had operated, the momentary operation of clutch magnet 904 causes code distributor 901 to transmit the character Y over the data link to all traffic reporting circuits and to the traffic control unit 133 at Miami. Sequential selector 900 at St. Louis, having received the characters A–F–Y, momentarily closes its contacts 923 to complete an obvious operating circuit for relay 9AF which operates and locks through its contacts 1, over conductor 925 and through normal contacts 924 to ground in sequential selector 900. Contacts 924 in sequential selector 900 will remain closed holding relay 9AF operated until the St. Louis office can "answer back," in reply to a subsequent interrogation, that the "overload" condition no longer exists.

Relay 9AF also actuates its transfer contacts 2 and 3 to extinguish no overload lamp 926 and light overload lamp 927 on the network display panel 945 associated with the St. Louis regional center. The sequential selectors at the other traffic reporting circuits also respond to the receipt of the character sequence A–F–Y by operating relays similar to relay 9AF in FIG. 9 to indicate to their respective control switching points that an overload exists at the St. Louis regional center.

At the Miami toll center traffic control unit 133 also receives the character Y as transmitted from traffic reporting circuit 126 associated with the St. Louis regional center. Line relay 7LR and select magnet 714 in sequential selector 700 (FIG. 7) respond to the receipt of the character Y by momentarily operating contacts 741 and 725. Contact 725 of sequential selector 700 momentarily lights answer lamp 726 and contacts 741 of sequential selector 700 extend ground over conductor 727 to reoperate relay 7TD. Relay 7TD, in operating, locks through its contacts 1 and through the normal contacts 719–723 in sequential selector 700.

The operation of relay 7TD and the lighting of answer lamp 726 indicate to the traffic control unit that the office being interrogated has "answered back" reporting its traffic condition to all of the switching centers in the network, and the traffic control unit can now proceed to interrogate the next switching center by transmitting the address code associated therewith. The operation of relay 7TD closes its contacts 2 to operate clutch magnet 724 and start transmitter-distributor 705 again. The sensing contacts of the transmitter-distributor 705 read the next address code on the perforated tape input to that transmitter-distributor, and the character A is transmitted over the data link to all the traffic reporting circuits in the network. Sequential selector 700 in the traffic control unit responds to the character A by opening its contacts 719 to release relay 7TD, and relay 7TD in releasing interrupts the operating circuit for clutch magnet 724 to stop transmitter-distributor 705. The transmitter-distributor, however, will send one additional character from its tape input before coming to rest. In this illustrative embodiment the address code associated with the second office to be interrogated comprises the characters A–G and, therefore, transmitter-distributor 705 will transmit the character G over the data link to all of the traffic reporting circuits.

Turning now to FIG. 8 and traffic reporting circuit 129 associated with the Dallas toll center whose address is AG, sequential selector 800 thereat responds to the sequence of characters AG by momentarily operating contacts 812 to momentarily operate relay 8SC. Relay 8SC in operating closes its contacts 3 to light the local SC lamp 843 and closes its contacts 2 to momentarily operate clutch magnet 804 in code distributor 801. The operation of magnet 804 causes code distributor 801 to transmit over the data link a character in accordance with the coding on its distributor leads DL–1 through DL–5. Under the assumed conditions, traffic reporting circuit 129 is associated with the Dallas toll center 103, and it has been assumed that the Dallas toll center is experiencing a normal traffic condition. Its relay 8A responsive to the load detector circuit 220 at Dallas would, therefore, be normal. With relay 8A normal the distributor leads DL– for code distributor 801 are coded so that the distributor answers back by transmitting the character R over the data link indicating a "no overload" condition at Dallas.

The receipt of the characters A–G from the traffic control unit and the answer-back character R from the Dallas traffic reporting circuit momentarily opens contacts 816 in sequential selector of traffic reporting circuit 129. Contacts 816 momentarily interrupt the locking circuit for relay 8AG to release that relay if it has been operated as a result of a prior "overload" report from the Dallas office. Since it has been assumed in this example that the Dallas office had not been overloaded, relay 8AG and similar relays in the other traffic reporting circuits would already be in their released condition.

At the traffic control unit 133 in FIG. 7, however, the receipt of the character R as transmitted by the code distributor 801 at the Dallas traffic reporting circuit causes sequential selector 700 of the traffic control unit to momentarily operate its contacts 728 and 729. Contacts 728 momentarily flash the answer lamp 726 indicating that the office being interrogated has answered, and contacts 729 operate relay 7TD which locks over the path previously traced through contacts 719–723 in sequential selector 700. Operation of relay 7TD at this time completes the circuit for reoperating clutch magnet 724 in transmitter-distributor 705 in preparation for transmitting the next address code.

Transmitter-distributor 705 transmits the address code for the next control switching point to be interrogated by transmitting the characters A–I over the data link. The Denver toll center assigned to the address code "AI" answers back by transmitting the character Y or the character R over the data link indicating that an "overload" or "no overload" condition exists at the Denver toll center. This polling operation under control of the tape-distributor 705 continues until all control switching points have been interrogated and have answered back reporting the traffic conditions being experienced thereat.

*Response to the receipt of traffic data*

Turning now to FIG. 8 and the traffic reporting circuit 129 associated with the Dallas toll center 103, sequential selector 800 momentarily operated its contacts 813 in response to the sequence of characters A and F transmitted by the traffic control unit 133 when St. Louis was being polled and the character Y transmitted by the St. Louis regional center in answering. The momentary operation of contacts 813 in sequential selector 800 completes a circuit for operating relay 8AF which locks through its contacts 1 and through normal contacts 814 in sequential selector 800. Relay 8AF, in operating, actuates its transfer of contacts 2 and 3 to extinguish "no overload" lamp 815 and light "overload" lamp 817 indicating to Dallas that St. Louis is experiencing a traffic overload.

Relay 8AF, in operating, also opens its contacts 4–7 in FIG. 2 thereby opening the group busy chain leads for the four subgroups of trunks in the first choice trunk group 115 to the St. Louis regional center.

It will be recalled from the previous description that decoder 500 at the Dallas toll center utilizes these group busy chain leads to ascertain which subgroups contain idle trunks before directing marker 503 to test and select a particular trunk in a subgroup. The grounds from idle trunk equipments, such as trunk equipment 209, normally hold relays 2GB0–2GB3 operated indicating to decoder 500 that idle trunks are available in these subgroups, but now having received an overload signal from the St. Louis regional center as indicated by the operated 8AF relay, the 2GB0–2GB3 relays associated with trunk group 115 to St. Louis are forced to release making this trunk group appear busy to subsequent calls even though idle trunks may be available in the route.

*Route advance features*

To further illustrate the decoder operation at the Dallas tool center when an overload condition exists at a regional center such as St. Louis, let it be assumed that customer 111 in FIG. 2 is trying to extend a call to customer 113 in FIG. 4 as previously described. Let it also be assumed that the call has progressed to the Dallas toll center 103 where translator 502 has been primed with the area code and local office code (305–CH3) for called customer 113. As with the previous example the first card is selected and read in translator 502 operating alternate route pattern relays 5ART7, 5ART4, 5ARU7 and 5ARU4 indicating that the alternate route pattern number for Miami is 00. These pattern number relays close through previously traced paths for operating relay 5RR0 and route relay 5RR00. Route relay 5RR00 and previously operated relay 5CI0 extend conductors 3201–3205 from contacts (in FIG. 5) of the group busy chain relays 2GB0–2GB3 to relays 5G0–5G3 in the decoder, permitting the decoder to determine if idle trunks are available in these subgroups. Since group busy chain relays 2GB0–2GB3 have now been released as a result of the operation of relay 8AF, relays 5G0–5G3 will also be released, and ground will be extended through normal contacts 3 of relays 2GB0, 2GB1, 2GB2 and 2GB3, over conductor 3205, through contacts 6 of relays 5RR00 and 5CI0, over conductor 5702, through equipment not shown and through contacts 6 of relay 5C0 to the upper winding of relay 5GB in decoder 500. Relay 5GB operates indicating an all trunk busy condition and extends battery through its lower winding, through its contacts 6 and through normal contacts 4 of relays 5G3, 5G2, 5G1 and 5G0, over conductor 7304 and through the winding of relay 5C0 and contacts 1 of relay 5RLS to ground, operating relay 5C0 and furnishing a locking path for relay 5GB under control of relay 5RLS.

In addition, relay 5GB extends battery through resistance R7 and its contacts 5, over conductor 507, through contacts 12 of route relay 5RR00, contacts 1 of relay 5RAV'0 and through the lower winding of relay 5RB0 to ground, operating relay 5RB0. In operating, relay 5RB0 completes a circuit which can be traced from battery through its upper winding, through its contacts 3, contacts 11 of relay 5CI0, contacts 3 of relay 5RAV'0, over conductor 508, through the winding of relay 5RLS and contacts 5 of relay CKG2 to ground to operate relay 5RLS and lock relay 5RB0 under control of its upper winding.

When relay 5RB0 operated, it opened its contacts 1 to release relay 5CI0, and when relay 5CI0 releases it opens its contacts 2–6 to disconnect the conductors 3201–3205 from relays 5G0–5G3 and relay 5GB in the decoder 500. The locking path for relay 5GB having previously been interrupted by the operation of relay 5RLS, the operating path for relay 5GB is now interrupted by the release of relay 5CI0, and relay 5GB releases.

With relays 5G0–5G3 and relay 5GB released, a circuit is completed for operating a route advance relay. This circuit can be traced from battery, through resistance R8, contacts 2 of relay 5GB, contacts 1 of relays 5G3, 5G2, 5G1 and 5G0, through resistance R9, over conductor 509, through contacts 2 of relay 5RB0 and the upper winding of route advance relay 5RAV0. With relay 5RAV0 operated ground is extended through contacts 2 of relay CKG2, contacts 3 of relay 5RAV0, through the winding of auxiliary relay 5RAV'0 and through the lower winding of relay 5RAV0 to battery, operating auxiliary relay 5RAV'0 and locking relay 5RAV0.

Relay 5RAV'0, in operating, opens its contacts 1 to further interrupt the operating circuit for relay 5RB0 and opens its contacts 3 to interrupt the locking circuit for relay 5RB0 and the operating circuit for relay 5RLS. Both relays 5RB0 and 5RLS release. Furthermore, relay 5RAV'0 completes an operating path for route relay 5RR41 associated with the alternate-route trunk group 117. This circuit can be traced from ground through contacts 2 of relay 5RAV'0, contacts 1 of route relay 5RR00, over conductor 5705, through normal contacts 3 of relay 5RT41, over conductor 20403 and through the winding of route relay 5RR41 to battery. With route relay 5RR41 operated, and relay 5CI2 having previously been operated, test leads from relays 5G0–5G3 and relay 5GB in the decoder are extended to the group busy chain relays 2GB10 to 2GB13 associated with the subgroups of alternate-route trunk group 117.

If it is assumed that idle trunks are available in each of the four subgroups of the alternate-route trunk group 117, relays 2GB10–2GB13 will be operated, and with relay 2GB10 operated, ground is extended through its contacts 4, through contacts 2 of relays 5RR41 and 5CI2, over conductor 510 and through the winding of relay 5G0 to battery, operating relay 5G0. Relay 5G0, in operating, informs decoder 500 that an idle trunk is available in the first subgroup of trunk group 117 to Chicago, and decoder 500 causes translator 502 to read the card associated with this subgroup so that marker 503 can test and select an idle trunk via Chicago to Miami.

Once the trunk location information has been forwarded to marker 503, decoder 500 can release and marker 503 then proceeds to establish a connection to an idle outgoing trunk in trunk group 117 and attach sender 207 to the idle trunk. Under the assumed conditions the call will be extended from the Dallas tool center 103 through the Chicago regional center 101, over a trunk in trunk group 120 to the Miami toll center 105 and on to local office 109 and the called customer 113. This portion of the call is established in the same manner as the call previously described with respect to the first choice trunk route and need not be reiterated herein for a complete understanding of our invention.

*Restoration of the network to normal*

In the example just described it had been assumed that an overload condition was detected at the St. Louis regional center 100. In response to the detection of an overload in the network, the traffic data link was interrupted by a "bid" signal which caused the motor control circuits at the various switching centers to prepare all traffic reporting circuits and the traffic control unit 133 for operation. Once the traffic control unit 133 was prepared, it began to interrogate the control switching points by transmitting over the data link to all of the control switching points an address code associated with one of the switching centers. The switching center corresponding to the address code being transmitted "answered back" over the data link to all of the control switching points by transmitting to them information pertaining to the traffic conditions at the interrogated office. The polling action or "roll call" performed by the traffic control unit will continue until all control switching points in the network have been interrogated and have answered back.

While in this illustrative embodiment of our invention each switching center reported over the data link as to its "overload" or "no overload" condition, it will be realized that additional information might be transmitted over the data link. For example, information might be transmitted to the various switching centers as to specific equipment such as markers, senders, etc. that are temporarily unavailable at a particular switching center, the length of time it is expected that this equipment will be unavailable and many other items of data that would be useful in determining the most expeditious manner of handling traffic.

Following the transmission of the last address code, which comprises the character sequence B–L associated with the Miami toll center, the traffic control unit 133 at Miami will wait for the answer back from the Miami traffic reporting circuit 131 and will then transmit a sequence of characters to determine whether the "polling" should continue or whether the traffic control unit and the traffic reporting circuits can be restored to normal. Relay 7TD in the traffic control unit operates after the last R or Y "answer back" signal from the last switching center (Miami) to be interrogated, and upon operating, relay 7TD energizes clutch magnet 724 to start transmitter-distributor 705. Transmitter-distributor 705 transmits the character E followed by the character figures in accordance with its tape input. Sequential selector 700 in the traffic control unit responds to the receipt of the character E by momentarily opening contacts 723 to interrupt the locking circuit for relay 7TD which releases and stops the transmitter-distributor 705. Sequential selector 700 also responds to the receipt of the character figures by closing its contacts 730 to momentarily operate relay 7F. Relay 7F, in operating, momentarily energizes clutch magnet 704 for code distributor 701, and code distributor 701 transmits a character in accordance with the coding on its distributor leads DL–1 through DL–5.

As a result of each switching center being interrogated by traffic control unit 133, the traffic reporting circuits, such as traffic reporting circuit 131 associated with Miami, will have relays operated therein indicating which switching centers were experiencing overload conditions. In the example described it was assumed that the St. Louis regional center 100 was experiencing an overload, and when that switching center was interrogated, it answered back accordingly to operate a relay in each traffic reporting circuit. In traffic reporting circuit 131, for instance, relay 7AF would be operated, and when relay 7AF or any of the other relays associated with the other switching centers are operated the operating circuit for slow-operate relay 7SO in traffic control unit 133 would be interrupted and relay 7SO would be released. With relay 7SO released, end-of-poll relay 7EP in the traffic control unit is also released, and in its released condition relay 7EP codes the distributor leads of code distributor 701 so that the character M is transmitted over the data link to restore to normal those relays such as 9A which had operated as a result of the overload detection at St. Louis. The character M also indicates that the traffic control unit 133 should continue its "polling" operation.

Turning now to FIG. 9, and the traffic reporting circuit 126 for the St. Louis regional center, it will be recalled that transmitter-distributor 705 had transmitted the character figures after interrogating the last switching center, and now upon receipt of the character M from code distributor 701 sequential selector 900 responds by momentarily opening its contacts 913 to interrupt the locking circuit for relay 9A which releases. It will also be recalled that relay 9A in traffic reporting circuit 126 and similar relays in the other traffic reporting circuits were operated and locked in response to the detection of a traffic overload at the respective switching centers. If St. Louis is no longer experiencing the traffic overload, relay 9A will stay released, but if St. Louis is still overloaded, relay 9A will be reoperated by detector circuit 600.

In response to the receipt of the character M the sequential selector 700 in the traffic control unit 133 momentarily operates its contacts 731 to operate relay 7TD which locks through its contacts 1 and contacts 719–723 to ground in sequential selector 700. With relay 7TD operated clutch magnet 724 for transmitter-distributor 705 is again operated to restart the transmitter-distributor. Transmitter-distributor 705 then begins a new poll by repeating the transmission of the preliminary control information followed by the address code "AF" of the first control switching point to be interrogated. The sequence of operations following this is as previously described wherein the traffic control unit will take a "roll call" of each control switching point by transmitting a corresponding address code and each control switching point will respond by transmitting over the link data which is indicative of the traffic conditions being experienced thereat.

Traffic control unit 133 will continue polling the control switching points in the network until all of the switching offices have reported back that they are experiencing normal traffic conditions, i.e., that no overload conditions exist at any control switching point in the network. When all control switching points report back a "no overload" condition, relays 7AF, 7AG, 7AI, 7BG, 7BK and 7BL will be released closing their contacts 4 to complete an obvious operating circuit for relay 7SO in traffic control unit 133 shown in FIG. 7. Relay 7SO is a time delay which will operate after sufficient time has passed to permit traffic control unit 133 to take an additional "roll call" before restoring the traffic reporting circuits to normal. This assures that the traffic control unit and the traffic reporting circuits are not restored to normal prematurely, if the traffic in the network were to return to normal for only a short period of time.

When time delay relay 7SO operates it closes its contacts 1 to complete an obvious operating circuit for end-of-poll relay 7EP which informs the traffic control unit to end the polling operation. Relay 7EP, in operating, closes its contacts 1 to light end-of-poll lamp 732 and closes its contacts 3 and 6 to code distributor leads DL–5 and DL–3 so that code distributor 701 will now transmit the character H when clutch magnet 704 is actuated.

It will be recalled that after the last address code is transmitted over the data link and the traffic control unit receives an answer back, transmitter-distributor 705 was actuated to transmit the characters E and FIGURES. Sequential selector 700 in the traffic control unit responds to the receipt of the character FIGURES by momentarily operating its contacts 730 to momentarily operate relay 7F which starts code distributor 701. In the prior example, when code distributor 701 was actuated with relay 7EP released, the character M was transmitted over the data link causing the traffic control unit to continue polling the various switching centers. With relay 7EP now operated as a result of taking a "roll call" and finding no overloaded control switching points, code distributor 701 will transmit the character H over the data link.

The receipt of the character FIGURES followed by the character H, which indicates that the polling can be terminated, causes sequential selector 900 in FIG. 9 to momentarily open its contacts 912 and close its contacts 932. Contacts 912 open the locking circuit for relay 9A (which may have operated under control of detector circuit 600) to assure that relay 9A has released, and FIGURES –H contacts 932 connect alternating-current source 921 to the winding of stop magnet 933 to momentarily energize that stop magnet. The momentary energization of stop magnet 933 causes contacts 920 to open thereby disconnecting the alternating-current supply from motor 902 and relay 9L. Motor 902 stops and relay 9L releases thus restoring traffic reporting circuit 126 to normal.

Similar operations take place at the traffic control unit 133 and the other traffic reporting circuits restoring all of these circuits to normal.

Although in the embodiment of the invention shown and described the "roll call" was initiated in response to an adverse network traffic condition and was restored when the network traffic had returned to normal, it will be appreciated that continuous polling could also be employed herein. Further, although in the specific embodiment of the invention described, alternate-routing resulted from the reception of traffic overload signals, it will be readily apparent to those skilled in the art that other remedial action can be taken to minimize the effects of traffic congestion in the network. For example, second trial and recycling operations of certain common control equipment might be altered. Also, the timing operations of certain control equipment at the switching centers might be changed to make this equipment readily available to serve more calls, and instead of diverting all traffic from a congested route, only selected traffic could be diverted to avoid congesting the alternate route.

It is to be understood that the above-described arrangements are merely illustrative of the application of the principles of the invention. Numerous other arrangements may be devised by those skilled in the art without departing from the spirit and scope of the invention.

What is claimed is:

1. In a communication network, a plurality of switching offices, a plurality of trunks extending from said offices, switching means at said offices effective when available in response to call directive signals transmitted over said trunks for interconnecting said trunks for communication purposes, means for transmitting independently of said call directive signals a load interrogating signal to each said office and for transmitting to other offices indicia representative of the availability of said switching means at said interrogated offices, and means at said other offices for controlling said switching means in accordance with the indicia received thereat.

2. In a communication network, a plurality of switching offices, a plurality of trunks extending from said offices, switching means at said offices effective when available in response to call directive signals transmitted over said trunks for interconnecting said trunks for communication purposes, means at one of said offices for transmitting independently of said call directive signals load interrogating signals to said offices, means at said offices responsive to said interrogating signals for transmitting to other offices indicia representative of the availability of said switching means at said offices, and means at said offices for controlling said switching means in accordance with the indicia received thereat.

3. In a communication network, a plurality of switching offices, a plurality of trunks extending from said offices, switching means at said offices effective when available in response to call directive signals transmitted over said trunks for interconnecting said trunks, load indicating means at each said office actuated in response to the unavailability of said switching means thereat, means at one of said offices responsive to the actuation of said load indicating means for transmitting independently of said call directive signals load interrogating signals to said offices, means at said offices responsive to said interrogating signals for transmitting to other offices indicia representative of the load conditions at said offices, and means at each said office for controlling said switching means in accordance with the load indicia received thereat.

4. In a communication system, a plurality of trunks, a plurality of switching offices each comprising program means for controlling the selection of said trunks in accordance with a predetermined program and switching means responsive to call directive signals over said trunks for interconnecting selected trunks for communication purposes, load indicating means at each said office actuated in response to the unavailability of said switching means thereat, means at one of said offices responsive to the actuation of said indicating means for transmitting independently of said call directive signals traffic interrogating signals to said offices, means at said offices responsive to said interrogating signals for transmitting to other offices a signal indicative of the load conditions of said offices, and means at each said office for altering said predetermined program in accordance with said load signals.

5. In a communication system, a plurality of trunks, a plurality of communication centers coupled to said trunks, switching means at each said center responsive to call directive signals for interconnecting said trunks in accordance with a predetermined switching program, means effective when actuated independently of said call directive signals for polling said centers, load indicating means at each said center responsive to the unavailability of said switching means thereat for actuating said polling means, and means at each said center responsive to said polling means for transmitting to other centers load signals indicative of the load conditions of said centers, each said switching means comprising means responsive to said load signals for altering said switching program in accordance with said load signals.

6. In a communication system comprising a plurality of trunk connected switching offices wherein traffic originating at one office is connectable under control of call directive signals to another office over trunks therebetween, switching means at said offices for interconnecting said trunks thereat, traffic control means at one of said offices, a data link interconnecting said offices and said traffic control means, load indicating means at each said office responsive to the unavailability of said switching means thereat for transmitting a first signal over said data link to said traffic control means, said traffic control means comprising means independent of said call directive signals responsive to said first signal for transmitting a traffic interrogating signal over said data link to each said office, means at each said office responsive to said interrogating signal for transmitting over said data link to other offices a load signal indicative of the load condition at said interrogated office, and means at each said office responsive to said load signals for controlling said switching means thereat.

7. In a communication system, a plurality of communication trunks, a plurality of switching centers each coupled to certain of said trunks, switching means at each said center responsive to call directive signals for selecting the trunks coupled thereto, traffic control means including a data link interconnecting said centers, load indicating means at each said center responsive to the unavailability of said switching means for transmitting a bid signal over said data link to said control means, said control means including means responsive to said bid signal for transmitting over said data link a plurality of discrete traffic interrogating signals each corresponding to a particular switching center, means at each said switching center responsive to the particular interrogating signal corresponding to said center for transmitting over said data link to other centers load signals indicative of the load conditions of said interrogated center, and means at each said center responsive to said load signals for controlling the selection of said trunks by said switching means.

8. In a communication network wherein connections between remote offices are progressively extended via intermediate switching offices under control of call directive signals, a calling office; a plurality of routing means each comprising a first office adjacent to said calling office, a second office and trunks coupling said offices; each said first office comprising switching means effective in response to call directive signals over trunks from said calling office when available for interconnecting idle ones of said trunks between said first and second offices; means for transmitting independently of said call directive signals traffic interrogating signals to said routing means and for transmitting to said calling office data indicative of the idle condition of said routing means; and means at said calling office for selecting said routing means in accordance wtih the data received thereat.

9. The invention defined in claim 8 wherein multistate detecting means is provided at each said switching office for indicating the availability of said switching means to extend a said connection, wherein said means for transmitting interrogating signals comprises means responsive to said detecting means for transmitting said data, wherein said data comprises a plurality of load signals each representative of the state of one of said detecting means, and wherein said calling office selecting means comprises means responsive to each said load signal.

10. In a communication network wherein connections between remote offices are progressively extended via intermediate switching offices under control of call directive signals, a calling office including route selecting means; a plurality of routing means each comprising a first office adjacent to said calling office, a second office and trunks coupling said offices; each said first office comprising switching means responsive to a service request signal from said calling office for interconnecting idle ones of said trunks between said first and second offices and for transmitting call directive signals over said interconnected trunks to effect connections at said second offices; detecting means coupled to each said routing means and conditioned in accordance with the availability of said switching means to interconnect said offices; control means at one of said offices responsive to at least one of said detecting means for transmitting independently of said call directive signals traffic interrogating signals to all said detecting means; each said detecting means comprising means responsive to said interrogating signals for transmitting to said calling office data signals indicative of the condition of said detecting means; and means responsive to said data signals for controlling said route selecting means at said calling office.

11. The invention defined in claim 10 wherein each said detecting means comprises indicating means adapted to be set in a first condition when said switching means is unavailable and a second condition when said switching means is available, wherein said control means comprises means actuated when one of said indicating means is in its first condition for transmitting said interrogating signals, and wherein means are provided for maintaining said interrogating signal transmitting means actuated until all said indicating means are in said second condition.

12. In a communication system, a plurality of trunks, a plurality of switching offices each coupled to certain of said trunks, switching means at each said office responsive to a service request signal over one of said trunks for selecting and establishing connections to other of said trunks, traffic control means at one of said offices and a data link interconnecting said traffic control means with said offices, load indicating means at each said office effective when said switching means encounters a blocking condition for transmitting a bid signal over said link to said control means, said control means including means responsive to a bid signal from said load indicating means for transmitting over said link a plurality of address codes each corresponding to a particular switching center, and means at each switching center for registering said address codes and responsive to the reception of its corresponding address code for transmitting over said link to other offices signals indicative of the load conditions of said addressed office, each said switching means comprising means responisve to load signals from other said offices for selecting said trunks in accordance with said load signals.

13. In a communication network wherein connections between remote offices are progressively extended via a plurality of serially connected switching offices, a plurality of switching offices each comprising first trunks, second trunks, and switching means responsive to service request signals on said first trunks for extending connections to said second trunks and transmitting call directive signals thereover; a calling office connectable to said first trunks and having means for selecting available ones of said first trunks; and traffic control means comprising means for transmitting independently of said call directive signals traffic interrogating signals to said switching offices, means at each said switching office responsive to said interrogating signals for transmitting to said calling office reply signals indicative of the availability of said switching office to extend connections over said second trunks, and means at said calling office responsive to said reply signals for causing said trunk selecting means to select first trunks independently of the availability of said first trunks.

14. In a switching system, an originating office, a plurality of other offices, trunks extending from said originating office to adjacent ones of said other offices; means at said originating office for selecting said trunks, for testing the availability thereof and for transmitting call directive signals thereover; control means at one of said offices for transmitting independently of call directive signals traffic interrogating signals to said other offices, means at said other offices responsive to said interrogating signals for transmitting to said originating office load signals indicative of the traffic conditions beyond said adjacent offices, and means at said originating office for automatically directing said selecting means to selected trunks in accordance with the load signals received thereat.

15. The invention defined in claim 14 wherein said control means comprises means for causing distinctive load signals to be transmitted in accordance with the adverse and favorable traffic conditions for each said other office, and wherein said directing means comprises means responsive to each said distinctive load signal for directing said selecting means to select trunks to said other offices to bypass offices reporting adverse traffic conditions as indicated by said load signals.

16. In a communication network wherein connections between remote offices are progressively extended via intermediate switching offices, a calling office including route selecting means; a plurality of routing means each comprising components including a first office adjacent to said calling office, a second office and trunk means interconnecting said offices; each said office including switching means responsive to service request signals over certain of said trunks connected thereto for extending connections over other of said trunks; detecting means coupled to each said routing means and operative when one of said routing means components is unavailable for a said connection; means at one of said offices effective upon the operation of one of said detecting means for sequentially scanning said detecting means; said detecting means further comprising means effective when scanned for transmitting to said calling office signals indicative of the availability of said components; and means at said calling office for rendering said routing means unavailable to said route selecting means in accordance with said signals received thereat.

17. In a switching system, a calling office including a calling station; a plurality of routing means each comprising a first office adjacent to said calling office, a second office, trunks connected to said offices and switching means at said offices for interconnecting said trunks connected thereto; said calling office comprising control means responsive to a request by said station for service over a particular one of said routing means for extending a connection over said particular routing means; detecting means coupled to said routing means and effective when scanned for transmitting to said calling office signals indicative of the congestion of said routing means; means at one of said offices operative independently of said calling station for scanning said detecting means; means at said calling office for registering the signals received when each said detecting means is scanned; and means for blocking the extension of calls over said routing means in accordance with said registered signals and independently of requests for connection over said routing means.

References Cited

UNITED STATES PATENTS

| | | | |
|---|---|---|---|
| 2,227,488 | 1/1941 | Collis et al. | 179—18.21 |
| 2,421,919 | 6/1947 | Avery | 179—18.21 |
| 3,111,559 | 11/1963 | Jacobaeus et al. | 179—18.21 |
| 3,155,775 | 11/1964 | Zarouni | 179—18.21 |
| 3,211,836 | 10/1965 | Warman | 179—18.21 |
| 3,231,676 | 1/1966 | Carlstrom et al. | 179—18.21 |

KATHLEEN H. CLAFFY, *Primary Examiner.*

L. A. WRIGHT, *Assistant Examiner.*